(12) United States Patent
Xin et al.

(10) Patent No.: US 11,558,770 B2
(45) Date of Patent: Jan. 17, 2023

(54) METHOD FOR DETERMINING QOS DESCRIPTION INFORMATION AND APPARATUS

(71) Applicant: HUAWEI TECHNOLOGIES CO., LTD., Shenzhen (CN)

(72) Inventors: Yang Xin, Shanghai (CN); Weiwei Chong, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

(21) Appl. No.: 16/993,099

(22) Filed: Aug. 13, 2020

(65) Prior Publication Data

US 2020/0374743 A1    Nov. 26, 2020

Related U.S. Application Data

(63) Continuation of application No. PCT/CN2019/075044, filed on Feb. 14, 2019.

(30) Foreign Application Priority Data

Feb. 14, 2018  (CN) .......................... 201810153340.6

(51) Int. Cl.
  *H04W 28/02* (2009.01)
  *H04W 72/04* (2009.01)
  *H04W 72/08* (2009.01)

(52) U.S. Cl.
  CPC ..... *H04W 28/0268* (2013.01); *H04W 72/048* (2013.01); *H04W 72/085* (2013.01)

(58) Field of Classification Search
  CPC ........... H04W 28/0268; H04W 72/048; H04W 72/085
  See application file for complete search history.

(56) References Cited

U.S. PATENT DOCUMENTS

2011/0106933 A1 * 5/2011 Lovsen ............... H04L 12/1471
                                                        709/223
2017/0317894 A1   11/2017 Dao et al.
(Continued)

FOREIGN PATENT DOCUMENTS

CN         102783209 A       11/2012
CN         105207787 A   *   12/2015
(Continued)

OTHER PUBLICATIONS

SA WG2 Meeting #120,S2-172022: TS23.501 Reflective QoS deactivation Huawei, HiSilicon Mar. 27-31, 2017, Busan, Korea, total 3 pages.
(Continued)

*Primary Examiner* — Ayanah S George
(74) *Attorney, Agent, or Firm* — Hauptman Ham, LLP

(57) ABSTRACT

A method for determining quality of service (QoS) description information includes receiving at least one piece of QoS description information of a service. Each piece of the at least one piece of QoS description information includes parameter type information and a parameter requirement. The method also includes sending to a second core network element or an application function network element corresponding to the service, parameter type information and a parameter requirement in the at least one piece of QoS description information. The method further includes receiving from the second core network element or the application function network element, feedback information of the parameter type information and the parameter requirement. The method additionally includes determining at least one piece of target QoS description information in the at least one piece of QoS description information based on the feedback information.

20 Claims, 15 Drawing Sheets

(56) References Cited

U.S. PATENT DOCUMENTS

2017/0332282 A1    11/2017  Dao
2017/0374558 A1*   12/2017  Zhao ..................... H04W 16/10

FOREIGN PATENT DOCUMENTS

| CN | 105207787 A | 12/2015 |
| CN | 106817730 A | 6/2017 |
| CN | 107295576 A | 10/2017 |

OTHER PUBLICATIONS

Catt,"23.501: Clarify QoS control for GBR QoS flows",SA WG2 Meeting #123 S2-177345, Oct. 23-27, 2017, Ljubljana, Slovenia,Total 5 Pages.
International Search Report corresponding to International Application No. PCT/CN2019/075044, dated May 6, 2019, pp. 1-8, State Intellectual Property Office of the P.R. China, Beijing, China.
Chinese Office Action corresponding to Chinese Application No. 201810153340.6, dated Jun. 28, 2020, pp. 1-6, State Intellectual Property Office of the P.R. China, Beijing, China.
European Search Report issued in corresponding European Patent Application No. 19753906.7, dated Feb. 18, 2021, pp. 1-9, European Patent Office, Munich, Germany.

* cited by examiner

METHOD FOR DETERMINING QOS DESCRIPTION INFORMATION AND APPARATUS

CROSS-REFERENCE TO RELATED APPLICATIONS

This application is a continuation of International Application No. PCT/CN2019/075044, filed on Feb. 14, 2019, which claims priority to Chinese Patent Application No. 201810153340.6, filed on Feb. 14, 2018. The disclosure of the aforementioned applications are hereby incorporated by reference in their entireties.

TECHNICAL FIELD

This application relates to the communications field, and in particular, to a method for determining QoS description information and an apparatus.

BACKGROUND

Currently, a communications network may use a preset quality of service (QoS) mechanism to resolve problems such as network latency and congestion, to meet a communication quality requirement of a user. The preset QoS mechanism usually uses a subjective assumption or fixed QoS information to perform different control and management on different types of services. However, the subjective assumption or fixed QoS information may be inaccurate or not applicable to a network element. For example, when the fixed QoS information includes a packet loss rate or latency, a base station cannot determine, by using the packet loss rate or the latency, whether a quality of service requirement of a service is satisfied, and therefore cannot ensure quality of service of the service.

SUMMARY

Embodiments of this application provide a method for determining QoS description information and a method for transmitting QoS description information, so that a service-related network element in a network can participate in a process of selecting QoS description information. In this way, the quality of service of the service can be ensured.

According to a first aspect, an embodiment of this application provides a method for determining quality of service QoS description information. The method includes: receiving, by a first core network element from a data analytics network element, at least one piece of QoS description information a service, where each piece of the at least one piece of QoS description information includes parameter type information and a parameter requirement; sending, by the first core network element to a second core network element or an application function network element corresponding to the service, parameter type information and a parameter requirement in the at least one piece of QoS description information that correspond to the second core network element or the application function network element; receiving, by the first core network element from the second core network element or the application function network element, feedback information of the parameter type information and the parameter requirement in the at least one piece of QoS description information that correspond to the second core network element or the application function network element; and determining, by the first core network element, at least one piece of target QoS description information in the at least one piece of QoS description information based on the feedback information. Therefore, in the prior art, different control and management are performed on different types of services by using a subjective assumption or fixed QoS information, but the subjective assumption or the fixed QoS information may be inaccurate or not applicable to a network element. However, in this embodiment of this application, the first core network element may determine one piece of target QoS description information of the service in the received at least one piece of QoS description information based on the feedback information, and allocate a radio resource to the service and/or execute a quality of service policy based on the target QoS description information, so that quality of service of the service can be ensured.

In a possible implementation, each piece of the at least one piece of QoS description information further includes network element information, and the network element information is used to indicate a network element corresponding to parameter type information and parameter requirement in the QoS description information.

In a possible implementation, the method further includes: determining, by the first core network element, information indicating whether the first core network element satisfies parameter type information and a parameter requirement in the at least one piece of QoS description information that correspond to the first core network element.

In a possible implementation, the receiving, by the first core network element from the second core network element, feedback information of the parameter type information and the parameter requirement in the at least one piece of QoS description information includes: receiving, by the first core network element from the second core network element, information indicating whether the second core network element satisfies the parameter type information and the parameter requirement that are sent by the first core network element and that correspond to the second core network element.

In a possible implementation, the sending, by the first core network element to a second core network element corresponding to the service, parameter type information and a parameter requirement in the at least one piece of QoS description information that correspond to the second core network element includes: sending, by the first core network element to the second core network element corresponding to the service, the parameter type information and the parameter requirement in the at least one piece of QoS description information that correspond to the second core network element and the information indicating whether the first core network element satisfies the parameter type information and the parameter requirement in the at least one piece of QoS description information that correspond to the first core network element.

In a possible implementation, the receiving, by the first core network element from the second core network element, feedback information of the parameter type information and the parameter requirement in the at least one piece of QoS description information includes: receiving, by the first core network element from the second core network element, information indicating whether the second core network element satisfies the parameter type information and the parameter requirement that are sent by the first core network element and that correspond to the second core network element and the information indicating whether the first core network element satisfies the parameter type information and the parameter requirement in the at least one piece of QoS description information that correspond to the first core network element.

In a possible implementation, the sending, by the first core network element to a second core network element corresponding to the service, parameter type information and a parameter requirement in the at least one piece of QoS description information that correspond to the second core network element includes: sending, by the first core network element to the second core network element corresponding to the service, the parameter type information and the parameter requirement in the at least one piece of QoS description information that correspond to the second core network element, the information indicating whether the first core network element satisfies the parameter type information and the parameter requirement in the at least one piece of QoS description information that correspond to the first core network element, and information indicating whether the application function network element satisfies the parameter type information and the parameter requirement in the at least one piece of QoS description information that correspond to the application function network element.

In a possible implementation, the receiving, by the first core network element from the second core network element, feedback information of the parameter type information and the parameter requirement in the at least one piece of QoS description information includes: receiving, by the first core network element from the second core network element, information indicating whether the second core network element satisfies the parameter type information and the parameter requirement that are sent by the first core network element and that correspond to the second core network element, the information indicating whether the first core network element satisfies the parameter type information and the parameter requirement in the at least one piece of QoS description information that correspond to the first core network element, and the information indicating whether the application function network element satisfies the parameter type information and the parameter requirement in the at least one piece of QoS description information that correspond to the application function network element.

In a possible implementation, the receiving, by the first core network element from the application function network element, feedback information of the parameter type information and the parameter requirement in the at least one piece of QoS description information includes: receiving, by the first core network element from the application function network element, information indicating whether the application function network element satisfies the parameter type information and the parameter requirement that are sent by the first core network element and that correspond to the application function network element.

In a possible implementation, the sending, by the first core network element to an application function network element corresponding to the service, parameter type information and a parameter requirement in the at least one piece of QoS description information that correspond to the application function network element includes: sending, by the first core network element to the application function network element corresponding to the service, the parameter type information and the parameter requirement in the at least one piece of QoS description information that correspond to the application function network element and the information indicating whether the first core network element satisfies the parameter type information and the parameter requirement in the at least one piece of QoS description information that correspond to the first core network element.

In a possible implementation, the receiving, by the first core network element from the application function network element, feedback information of the parameter type information and the parameter requirement in the at least one piece of QoS description information includes: receiving, by the first core network element from the application function network element, information indicating whether the application function network element satisfies the parameter type information and the parameter requirement that are sent by the first core network element and that correspond to the application function network element and the information indicating whether the first core network element satisfies the parameter type information and the parameter requirement in the at least one piece of QoS description information that correspond to the first core network element.

In a possible implementation, the sending, by the first core network element to an application function network element corresponding to the service, parameter type information and a parameter requirement in the at least one piece of QoS description information that correspond to the application function network element includes: sending, by the first core network element to the application function network element corresponding to the service, the parameter type information and the parameter requirement in the at least one piece of QoS description information that correspond to the application function network element, the information indicating whether the first core network element satisfies the parameter type information and the parameter requirement in the at least one piece of QoS description information that correspond to the first core network element, and information indicating whether the second core network element satisfies the parameter type information and the parameter requirement in the at least one piece of QoS description information that correspond to the second core network element.

In a possible implementation, the receiving, by the first core network element from the application function network element, feedback information of the parameter type information and the parameter requirement in the at least one piece of QoS description information includes: receiving, by the first core network element from the application function network element, information indicating whether the application function network element satisfies the parameter type information and the parameter requirement that are sent by the first core network element and that correspond to the application function network element, the information indicating whether the first core network element satisfies the parameter type information and the parameter requirement in the at least one piece of QoS description information that correspond to the first core network element, and the information indicating whether the second core network element satisfies the parameter type information and the parameter requirement in the at least one piece of QoS description information that correspond to the second core network element.

In a possible implementation, the sending, by the first core network element to a second core network element corresponding to the service, parameter type information and a parameter requirement in the at least one piece of QoS description information that correspond to the second core network element includes: sending, by the first core network element to the second core network element corresponding to the service, the parameter type information and the parameter requirement in the at least one piece of QoS description information that correspond to the second core network element and parameter type information and a parameter requirement in the at least one piece of QoS description information that correspond to at least one of a third core network element, an access network element, and a terminal device.

In a possible implementation, the receiving, by the first core network element from the second core network element, feedback information of the parameter type information and the parameter requirement in the at least one piece of QoS description information that correspond to the second core network element includes: receiving, by the first core network element from the second core network element, the feedback information of the parameter type information and the parameter requirement in the at least one piece of QoS description information that correspond to the second core network element and feedback information of the parameter type information and the parameter requirement that correspond to the at least one of the third core network element, the access network element, and the terminal device.

In a possible implementation, the determining, by the first core network element, at least one piece of target QoS description information in the at least one piece of QoS description information based on the feedback information includes: determining, by the first core network element, the at least one piece of target QoS description information based on the feedback information of the parameter type information and the parameter requirement in the at least one piece of QoS description information that correspond to at least one of the first core network element, the second core network element, the third core network element, the access network element, the terminal device, and the application function network element.

According to a second aspect, an embodiment of this application provides a first core network element. The first core network element includes: a receiving unit, configured to receive, from a data analytics network element, at least one piece of QoS description information of a service, where each piece of the at least one piece of QoS description information includes parameter type information and a parameter requirement; a sending unit, configured to send, to a second core network element or an application function network element corresponding to the service, parameter type information and a parameter requirement in the at least one piece of QoS description information that correspond to the second core network element or the application function network element, where the receiving unit is further configured to receive, from the second core network element or the application function network element, feedback information of the parameter type information and the parameter requirement in the at least one piece of QoS description information that correspond to the second core network element or the application function network element; and a determining unit, configured to determine at least one piece of target QoS description information in the at least one piece of QoS description information based on the feedback information.

In a possible implementation, each piece of the at least one piece of QoS description information further includes network element information, and the network element information is used to indicate a network element corresponding to parameter type information and parameter requirement in the QoS description information.

In a possible implementation, the determining unit is further configured to determine information indicating whether the first core network element satisfies parameter type information and a parameter requirement in the at least one piece of QoS description information that correspond to the first core network element.

In a possible implementation, the receiving unit is configured to receive, from the second core network element, information indicating whether the second core network element satisfies the parameter type information and the parameter requirement that are sent by the first core network element and that correspond to the second core network element.

In a possible implementation, the sending unit is configured to send, to the second core network element corresponding to the service, the parameter type information and the parameter requirement in the at least one piece of QoS description information that correspond to the second core network element and the information indicating whether the first core network element satisfies the parameter type information and the parameter requirement in the at least one piece of QoS description information that correspond to the first core network element.

In a possible implementation, the receiving unit is further configured to receive, from the second core network element, information indicating whether the second core network element satisfies the parameter type information and the parameter requirement that are sent by the first core network element and that correspond to the second core network element and the information indicating whether the first core network element satisfies the parameter type information and the parameter requirement in the at least one piece of QoS description information that correspond to the first core network element.

In a possible implementation, the sending unit is configured to send, to the second core network element corresponding to the service, the parameter type information and the parameter requirement in the at least one piece of QoS description information that correspond to the second core network element, the information indicating whether the first core network element satisfies the parameter type information and the parameter requirement in the at least one piece of QoS description information that correspond to the first core network element, and information indicating whether the application function network element satisfies the parameter type information and the parameter requirement in the at least one piece of QoS description information that correspond to the application function network element.

In a possible implementation, the receiving unit is configured to receive, from the second core network element, information indicating whether the second core network element satisfies the parameter type information and the parameter requirement that are sent by the first core network element and that correspond to the second core network element, the information indicating whether the first core network element satisfies the parameter type information and the parameter requirement in the at least one piece of QoS description information that correspond to the first core network element, and the information indicating whether the application function network element satisfies the parameter type information and the parameter requirement in the at least one piece of QoS description information that correspond to the application function network element.

In a possible implementation, the receiving unit is configured to receive, from the application function network element, information indicating whether the application function network element satisfies the parameter type information and the parameter requirement that are sent by the first core network element and that correspond to the application function network element.

In a possible implementation, the sending unit is configured to send, to the application function network element corresponding to the service, the parameter type information and the parameter requirement in the at least one piece of QoS description information that correspond to the application function network element and the information indicating whether the first core network element satisfies the parameter type information and the parameter requirement in the at least one piece of QoS description information that correspond to the first core network element.

In a possible implementation, the receiving unit is configured to receive, from the application function network element, information indicating whether the application function network element satisfies the parameter type information and the parameter requirement that are sent by the first core network element and that correspond to the application function network element and the information indicating whether the first core network element satisfies the parameter type information and the parameter requirement in the at least one piece of QoS description information that correspond to the first core network element.

In a possible implementation, the sending unit is configured to send, to the application function network element corresponding to the service, the parameter type information and the parameter requirement in the at least one piece of QoS description information that correspond to the application function network element, the information indicating whether the first core network element satisfies the parameter type information and the parameter requirement in the at least one piece of QoS description information that correspond to the first core network element, and information indicating whether the second core network element satisfies the parameter type information and the parameter requirement in the at least one piece of QoS description information that correspond to the second core network element.

In a possible implementation, the receiving unit is configured to receive, from the application function network element, information indicating whether the application function network element satisfies the parameter type information and the parameter requirement that are sent by the first core network element and that correspond to the application function network element, the information indicating whether the first core network element satisfies the parameter type information and the parameter requirement in the at least one piece of QoS description information that correspond to the first core network element, and the information indicating whether the second core network element satisfies the parameter type information and the parameter requirement in the at least one piece of QoS description information that correspond to the second core network element.

In a possible implementation, the sending unit is configured to send, to the second core network element corresponding to the service, the parameter type information and the parameter requirement in the at least one piece of QoS description information that correspond to the second core network element and parameter type information and a parameter requirement in the at least one piece of QoS description information that correspond to at least one of a third core network element, an access network element, and a terminal device.

In a possible implementation, the receiving unit is configured to receive, from the second core network element, the feedback information of the parameter type information and the parameter requirement in the at least one piece of QoS description information that correspond to the second core network element and feedback information of the parameter type information and the parameter requirement that correspond to the at least one of the third core network element, the access network element, and the terminal device.

In a possible implementation, the determining unit is configured to determine the at least one piece of target QoS description information based on the feedback information of the parameter type information and the parameter requirement in the at least one piece of QoS description information that correspond to at least one of the first core network element, the second core network element, the third core network element, the access network element, the terminal device, and the application function network element.

According to a third aspect, an embodiment of the present invention provides an apparatus. The apparatus exists in a product form of a chip. A structure of the apparatus includes a processor and a memory. The memory is configured to couple to the processor, and stores a program instruction and data that are necessary for the apparatus. The processor is configured to execute the program instruction stored in the memory, so that the apparatus performs a function of the first core network element in the foregoing method.

According to a fourth aspect, an embodiment of the present invention provides a first core network element. The first core network element can implement a function performed by the first core network element in the foregoing method embodiment. The function may be implemented by hardware, or may be implemented by hardware executing corresponding software. The hardware or software includes one or more modules corresponding to the foregoing function.

In a possible design, a structure of the first core network element includes a processor and a communications interface. The processor is configured to support the first core network element in performing a corresponding function in the foregoing method. The communications interface is configured to support communication between the first core network element and another network element. The first core network element may further include a memory. The memory is configured to couple to the processor, and stores a program instruction and data that are necessary for the first core network element.

According to a fifth aspect, an embodiment of this application provides a computer storage medium, configured to store computer software instructions used by the foregoing method. The computer software instructions include a program designed for executing the foregoing aspects.

According to a sixth aspect, an embodiment of the present invention provides a computer program product including an instruction. When the computer program product runs on a computer, the computer is enabled to perform any method according to the first aspect.

According to a seventh aspect, an embodiment of this application provides a method for transmitting QoS description information. The method includes: receiving, by a second core network element from a first core network element, parameter type information and a parameter requirement in at least one piece of QoS description information of a service that correspond to the second core network element; and sending, by the second core network element to the first core network element, feedback information of the parameter type information and the parameter requirement in the at least one piece of QoS description information that correspond to the second core network element. After receiving the feedback information of the parameter type information and the parameter requirement that correspond to the second core network element, the first core network element may determine one piece of target QoS description information of the service based on the feedback information, and allocate a radio resource to the service based on the target QoS description information and/or execute a quality of service policy based on the target QoS description information, thereby ensuring quality of service of the service.

In a possible implementation, the receiving, by a second core network element from a first core network element, parameter type information and a parameter requirement in at least one piece of QoS description information of a service that correspond to the second core network element includes: receiving, by a second core network element from the first core network element, the parameter type information and the parameter requirement in the at least one piece of QoS description information of the service that correspond to the second core network element and parameter type information and a parameter requirement in the at least one piece of QoS description information that correspond to at least one of a third core network element, an access network element, and a terminal device.

In a possible implementation, the method further includes: sending, by the second core network element to a third core network element corresponding to the service, parameter type information and a parameter requirement in the at least one piece of QoS description information that correspond to the third core network element; or sending, by the second core network element to an access network element, parameter type information and a parameter requirement in the at least one piece of QoS description information that correspond to the access network element; and receiving, by the second core network element from the third core network element, feedback information of the parameter type information and the parameter requirement in the at least one piece of QoS description information; or receiving, by the second core network element from the access network element, feedback information of the parameter type information and the parameter requirement in the at least one piece of QoS description information.

In a possible implementation, the receiving, by a second core network element from a first core network element, parameter type information and a parameter requirement in at least one piece of QoS description information that correspond to the second core network element includes: receiving, by the second core network element from the first core network element, the parameter type information and the parameter requirement in the at least one piece of QoS description information that correspond to the second core network element and information indicating whether the first core network element satisfies the parameter type information and the parameter requirement in the at least one piece of QoS description information that correspond to the first core network element.

In a possible implementation, the sending, by the second core network element to a third core network element corresponding to the service, parameter type information and a parameter requirement in the at least one piece of QoS description information that correspond to the third core network element includes: sending, by the second core network element to the third core network element, the parameter type information and the parameter requirement in the at least one piece of QoS description information that correspond to the third core network element and information indicating whether the second core network element satisfies the parameter type information and the parameter requirement in the at least one piece of QoS description information that correspond to the second core network element; or the sending, by the second core network element to an access network element corresponding to the service, parameter type information and a parameter requirement in the at least one piece of QoS description information that correspond to the access network element includes: sending, by the second core network element to the access network element, the parameter type information and the parameter requirement in the at least one piece of QoS description information that correspond to the access network element and information indicating whether the second core network element satisfies the parameter type information and the parameter requirement in the at least one piece of QoS description information that correspond to the second core network element.

In a possible implementation, the receiving, by the second core network element from the third core network element, feedback information of the parameter type information and the parameter requirement in the at least one piece of QoS description information includes: receiving, by the second core network element from the third core network element, information indicating whether the third core network element satisfies parameter type information and a parameter requirement in the at least one piece of QoS description information that correspond to the third core network element; or the receiving, by the second core network element from the access network element, feedback information of the parameter type information and the parameter requirement in the at least one piece of QoS description information includes: receiving, by the second core network element from the access network element, information indicating whether the access network element satisfies parameter type information and a parameter requirement in the at least one piece of QoS description information that correspond to the access network element.

In a possible implementation, the sending, by the second core network element to the first core network element, feedback information of the parameter type information and the parameter requirement in the at least one piece of QoS description information includes: sending, by the second core network element to the first core network element, the information indicating whether the second core network element satisfies the parameter type information and the parameter requirement in the at least one piece of QoS description information that correspond to the second core network element.

In a possible implementation, the sending, by the second core network element to the first core network element, feedback information of the parameter type information and the parameter requirement in the at least one piece of QoS description information that correspond to the second core network element includes: sending, by the second core network element to the first core network element, the feedback information of the parameter type information and the parameter requirement in the at least one piece of QoS description information that correspond to the second core network element and feedback information of parameter type information and a parameter requirement in the at least one piece of QoS description information that correspond to at least one of the third core network element, the access network element, and a terminal device.

According to an eighth aspect, an embodiment of this application provides a second core network element. The second core network element includes: a receiving unit, configured to receive, from a first core network element, parameter type information and a parameter requirement in at least one piece of QoS description information of a service that correspond to the second core network element; and a sending unit, configured to send, to the first core network element, feedback information of the parameter type information and the parameter requirement in the at least one piece of QoS description information that correspond to the second core network element.

In a possible implementation, the receiving unit is configured to receive, from the first core network element, the parameter type information and the parameter requirement in the at least one piece of QoS description information of the service that correspond to the second core network element and parameter type information and a parameter requirement in the at least one piece of QoS description information that correspond to at least one of a third core network element, an access network element, and a terminal device.

In a possible implementation, the sending unit is further configured to: send, to a third core network element corresponding to the service, parameter type information and a parameter requirement in the at least one piece of QoS description information that correspond to the third core network element; or send, to an access network element, parameter type information and a parameter requirement in the at least one piece of QoS description information that correspond to the access network element; and the receiving unit is further configured to: receive, from the third core network element, feedback information of the parameter type information and the parameter requirement in the at least one piece of QoS description information; or receive from the access network element, feedback information of the parameter type information and the parameter requirement in the at least one piece of QoS description information.

In a possible implementation, the receiving unit is configured: receive, from the first core network element, the parameter type information and the parameter requirement in the at least one piece of QoS description information that correspond to the second core network element and information indicating whether the first core network element satisfies the parameter type information and the parameter requirement in the at least one piece of QoS description information that correspond to the first core network element.

In a possible implementation, the sending unit is configured to: send, to a third core network element, parameter type information and a parameter requirement in the at least one piece of QoS description information that correspond to the third core network element and information indicating whether the second core network element satisfies the parameter type information and the parameter requirement in the at least one piece of QoS description information that correspond to the second core network element; or send, to the access network element, the parameter type information and the parameter requirement in the at least one piece of QoS description information that correspond to the access network element and information indicating whether the second core network element satisfies the parameter type information and the parameter requirement in the at least one piece of QoS description information that correspond to the second core network element.

In a possible implementation, the receiving unit is configured to receive, from the third core network element, information indicating whether the third core network element satisfies parameter type information and a parameter requirement in the at least one piece of QoS description information that correspond to the third core network element; or receive, from the access network element, information indicating whether the access network element satisfies parameter type information and a parameter requirement in the at least one piece of QoS description information that correspond to the access network element.

In a possible implementation, the sending unit is configured to send, to the first core network element, information indicating whether the second core network element satisfies the parameter type information and the parameter requirement in the at least one piece of QoS description information that correspond to the second core network element.

In a possible implementation, the sending unit is configured to send, to the first core network element, feedback information of the parameter type information and the parameter requirement in the at least one piece of QoS description information that correspond to the second core network element and feedback information of the parameter type information and the parameter requirement in the at least one piece of QoS description information that correspond to the at least one of the third core network element, the access network element, and the terminal device.

According to a ninth aspect, an embodiment of the present invention provides an apparatus. The apparatus exists in a product form of a chip. A structure of the apparatus includes a processor and a memory. The memory is configured to couple to the processor, and stores a program instruction and data that are necessary for the apparatus. The processor is configured to execute the program instruction stored in the memory, so that the apparatus performs a function of the second core network element in the foregoing method.

According to a tenth aspect, an embodiment of the present invention provides a second core network element. The second core network element can implement a function performed by the second core network element in the foregoing method embodiment. The function may be implemented by hardware, or may be implemented by hardware executing corresponding software. The hardware or software includes one or more modules corresponding to the foregoing function.

In a possible design, a structure of the second core network element includes a processor and a communications interface. The processor is configured to support the second core network element in performing a corresponding function in the foregoing method. The communications interface is configured to support communication between the second core network element and another network element. The second core network element may further include a memory. The memory is configured to couple to the processor, and stores a program instruction and data that are necessary for the second core network element.

According to an eleventh aspect, an embodiment of this application provides a computer storage medium, configured to store computer software instructions used by the foregoing method. The computer software instructions include a program designed for executing the foregoing aspects.

According to a twelfth aspect, an embodiment of the present invention provides a computer program product including an instruction. When the computer program product runs on a computer, the computer is enabled to perform any method according to the seventh aspect.

According to a thirteenth aspect, a method for transmitting QoS description information is provided. The method includes: receiving, by an access network element from a second core network element, parameter type information and a parameter requirement in at least one piece of QoS description information of a service that correspond to the access network element; and sending, by the access network element to the second core network element, feedback information of the parameter type information and the parameter requirement in the at least one piece of QoS description information. After receiving the feedback information of the parameter type information and the parameter requirement that correspond to the access network element, the second core network element may send, to a first core network element, the feedback information of the parameter type information and the parameter requirement that correspond to the access network element, so that the first core network element can determine one piece of target QoS description information of the service based on the feedback information, and allocate a radio resource to the service based on the target QoS description information and/or execute a quality of service policy based on the target QoS description information, thereby ensuring quality of service of the service.

In a possible implementation, the receiving, by an access network element from a second core network element, parameter type information and a parameter requirement in at least one piece of QoS description information of a service that correspond to the access network element includes: receiving, by the access network element from the second core network element, the parameter type information and the parameter requirement in the at least one piece of QoS description information of the service that correspond to the second core network element and parameter type information and a parameter requirement in the at least one piece of QoS description information that correspond to a terminal device.

In a possible implementation, the method further includes: sending, by the access network element to a terminal device corresponding to the service, parameter type information and a parameter requirement in the at least one piece of QoS description information that correspond to the terminal device; and receiving, by the access network element from the terminal device, feedback information of the parameter type information and the parameter requirement in the at least one piece of QoS description information.

In a possible implementation, the receiving, by an access network element from a second core network element, parameter type information and a parameter requirement in at least one piece of QoS description information of a service that correspond to the access network element includes: receiving, by the access network element from the second core network element, the parameter type information and the parameter requirement in the at least one piece of QoS description information that correspond to the access network element and information indicating whether the second core network element satisfies the parameter type information and the parameter requirement in the at least one piece of QoS description information that correspond to the second core network element.

In a possible implementation, the sending, by the access network element to a terminal device corresponding to the service, parameter type information and a parameter requirement in the at least one piece of QoS description information that correspond to the terminal device includes: sending, by the access network element to the terminal device, the parameter type information and the parameter requirement in the at least one piece of QoS description information that correspond to the terminal device and information indicating whether the access network element satisfies the parameter type information and the parameter requirement in the at least one piece of QoS description information that correspond to the access network element.

In a possible implementation, the receiving, by the access network element from the terminal device, feedback information of the parameter type information and the parameter requirement in the at least one piece of QoS description information includes: receiving, by the access network element from the terminal device, information indicating whether the terminal device satisfies the parameter type information and the parameter requirement in the at least one piece of QoS description information that correspond to the terminal device.

In a possible implementation, the sending, by the access network element, the feedback information to the second core network element includes: sending, by the access network element to the second core network element, information indicating whether the access network element satisfies the parameter type information and the parameter requirement in the at least one piece of QoS description information that correspond to the access network element.

In a possible implementation, the sending, by the access network element to the second core network element, feedback information of the parameter type information and the parameter requirement in the at least one piece of QoS description information includes: sending, by the access network element to the second core network element, the feedback information of the parameter type information and the parameter requirement in the at least one piece of QoS description information and feedback information of the parameter type information and the parameter requirement in the at least one piece of QoS description information that correspond to the terminal device.

According to a fourteenth aspect, an access network element is provided. The access network element includes: a receiving unit, configured to receive, from a second core network element, parameter type information and a parameter requirement in at least one piece of QoS description information of a service that correspond to an access network element; and a sending unit, configured to send, to the second core network element, feedback information of the parameter type information and the parameter requirement in the at least one piece of QoS description information.

In a possible implementation, the receiving unit is configured to receive, from the first core network element, the parameter type information and the parameter requirement in the at least one piece of QoS description information of the service that correspond to the second core network element and parameter type information and a parameter requirement in the at least one piece of QoS description information that correspond to a terminal device.

In a possible implementation, the sending unit is further configured to send, to a terminal device corresponding to the service, parameter type information and a parameter requirement in the at least one piece of QoS description information that correspond to the terminal device; and the receiving unit is further configured to receive, from the terminal device, feedback information of the parameter type information and the parameter requirement in the at least one piece of QoS description information.

In a possible implementation, the receiving unit is configured receive, from the second core network element, the parameter type information and the parameter requirement in the at least one piece of QoS description information that correspond to the access network element and information indicating whether the second core network element satisfies the parameter type information and the parameter requirement in the at least one piece of QoS description information that correspond to the second core network element.

In a possible implementation, the sending unit is configured to send, to the terminal device, the parameter type information and the parameter requirement in the at least one piece of QoS description information that correspond to the terminal device and information indicating whether the access network element satisfies the parameter type information and the parameter requirement in the at least one piece of QoS description information that correspond to the access network element.

In a possible implementation, the receiving unit is configured to receive, from the terminal device, information indicating whether the terminal device satisfies the parameter type information and the parameter requirement in the at least one piece of QoS description information that correspond to the terminal device.

In a possible implementation, the sending unit is configured to send, to the second core network element, information indicating whether the access network element satisfies the parameter type information and the parameter requirement in the at least one piece of QoS description information that correspond to the access network element.

In a possible implementation, the sending unit is configured to send, to the second core network element, feedback information of the parameter type information and the parameter requirement in the at least one piece of QoS description information and feedback information of the parameter type information and the parameter requirement in the at least one piece of QoS description information that correspond to the terminal device.

According to a fifteenth aspect, an embodiment of the present invention provides an apparatus. The apparatus exists in a product form of a chip. A structure of the apparatus includes a processor and a memory. The memory is configured to couple to the processor, and stores a program instruction and data that are necessary for the apparatus. The processor is configured to execute the program instruction stored in the memory, so that the apparatus performs a function of the access network element in the foregoing method.

According to a sixteenth aspect, an embodiment of the present invention provides an access network element. The access network element can implement a function performed by the access network element in the foregoing method embodiment. The function may be implemented by hardware, or may be implemented by hardware executing corresponding software. The hardware or software includes one or more modules corresponding to the foregoing function.

In a possible design, a structure of the access network element includes a processor and a communications interface. The processor is configured to support the access network element in performing a corresponding function in the foregoing method. The communications interface is configured to support communication between the access network element and another network element. The access network element may further include a memory. The memory is configured to couple to the processor, and stores a program instruction and data that are necessary for the access network element.

According to a seventeenth aspect, an embodiment of this application provides a computer storage medium, configured to store computer software instructions used by the foregoing method. The computer software instructions include a program designed for executing the foregoing aspects.

According to an eighteenth aspect, an embodiment of the present invention provides a computer program product including an instruction. When the computer program product runs on a computer, the computer is enabled to perform any method according to the thirteenth aspect.

According to a nineteenth aspect, a method for transmitting QoS description information is provided. The method includes: receiving, by a terminal device from an access network element, parameter type information and a parameter requirement in at least one piece of QoS description information of a service that correspond to the terminal device; and sending, by the terminal device to the access network element, feedback information of the parameter type information and the parameter requirement in the at least one piece of QoS description information. After receiving the feedback information of the parameter type information and the parameter requirement that correspond to the terminal device, the access network element may send, to a first core network element by using the second core network element, the feedback information of the parameter type information and the parameter requirement that correspond to the terminal device, so that the first core network element can determine one piece of target QoS description information of the service based on the feedback information, and allocate a radio resource to the service based on the target QoS description information and/or execute a quality of service policy based on the target QoS description information, thereby ensuring quality of service of the service.

In a possible implementation, the receiving, by a terminal device from an access network element, parameter type information and a parameter requirement in at least one piece of QoS description information of a service that correspond to the terminal device includes: receiving, by the terminal device from the access network element, the parameter type information and the parameter requirement in the at least one piece of QoS description information that correspond to the terminal device and information indicating whether the access network element satisfies parameter type information and a parameter requirement in the at least one piece of QoS description information that correspond to the access network element.

In a possible implementation, the sending, by the terminal device to the access network element, feedback information of the parameter type information and the parameter requirement in the at least one piece of QoS description information includes: sending, by the terminal device to the access network element, information indicating whether the terminal device satisfies the parameter type information and the parameter requirement in the at least one piece of QoS description information that correspond to the terminal device.

According to a twentieth aspect, a terminal device is provided. The terminal device includes: a receiving unit, configured to receive, from an access network element, parameter type information and a parameter requirement in at least one piece of QoS description information of a service that correspond to the terminal device; and a sending unit, configured to send, to the access network element, feedback information of the parameter type information and the parameter requirement in the at least one piece of QoS description information.

In a possible implementation, the receiving unit is configured to receive, from the access network element, the parameter type information and the parameter requirement in the at least one piece of QoS description information that correspond to the terminal device and information indicating whether the access network element satisfies parameter type information and a parameter requirement in the at least one piece of QoS description information that correspond to the access network element.

In a possible implementation, the sending unit is configured to send, to the access network element, information indicating whether the terminal device satisfies the parameter type information and the parameter requirement in the at least one piece of QoS description information that correspond to the terminal device.

According to a twenty-first aspect, an embodiment of the present invention provides an apparatus. The apparatus exists in a product form of a chip. A structure of the apparatus includes a processor and a memory. The memory is configured to couple to the processor, and stores a program instruction and data that are necessary for the apparatus. The processor is configured to execute the program instruction stored in the memory, so that the apparatus performs a function of the terminal device in the foregoing method.

According to a twenty-second aspect, an embodiment of the present invention provides a terminal device. The terminal device can perform a function performed by the terminal device in the foregoing method embodiment. The function may be implemented by hardware, or may be implemented by hardware executing corresponding software. The hardware or software includes one or more modules corresponding to the foregoing function.

In a possible design, a structure of the terminal device includes a processor and a communications interface. The processor is configured to support the terminal device in performing a corresponding function in the foregoing method. The communications interface is configured to support communication between the terminal device and another network element. The terminal device may further include a memory. The memory is configured to couple to the processor, and stores a program instruction and data that are necessary for the terminal device.

According to a twenty-third aspect, an embodiment of this application provides a computer storage medium, configured to store computer software instructions used by the foregoing method. The computer software instructions include a program designed for executing the foregoing aspects.

According to a twenty-fourth aspect, an embodiment of the present invention provides a computer program product including an instruction. When the computer program product runs on a computer, the computer is enabled to perform any method according to the thirteenth aspect.

BRIEF DESCRIPTION OF DRAWINGS

FIG. 2-1 and FIG. 2-2 are a schematic diagram of signal exchange for determining QoS description information according to an embodiment of this application;

FIG. 3-1 and FIG. 3-2 are a schematic diagram of signal exchange for determining QoS description information according to an embodiment of this application;

FIG. 4-1 and FIG. 4-2 are a schematic diagram of a form of at least one piece 2I of QoS description information according to an embodiment of this application;

FIG. 5-1 and FIG. 5-2 are a schematic diagram of a form of at least one piece of QoS description information according to an embodiment of this application;

DESCRIPTION OF EMBODIMENTS

Embodiments of this application may be applied to a wireless communications system or a fixed network communications system. The wireless communications system includes a long term evolution (LTE) system provided in the 3rd generation partnership project (3GPP), a 5th generation (5G) mobile communications system, a global system for mobile communications (GSM), a code division multiple access (CDMA) system, a wideband code division multiple access (WCDMA) system, a subsequently evolved communications system, and the like. The fixed network communications system includes a multi-service access node (MSAN) system, a cable modem termination system (CMTS), and a broadband remote access server (BRAS) system.

Figure 1:
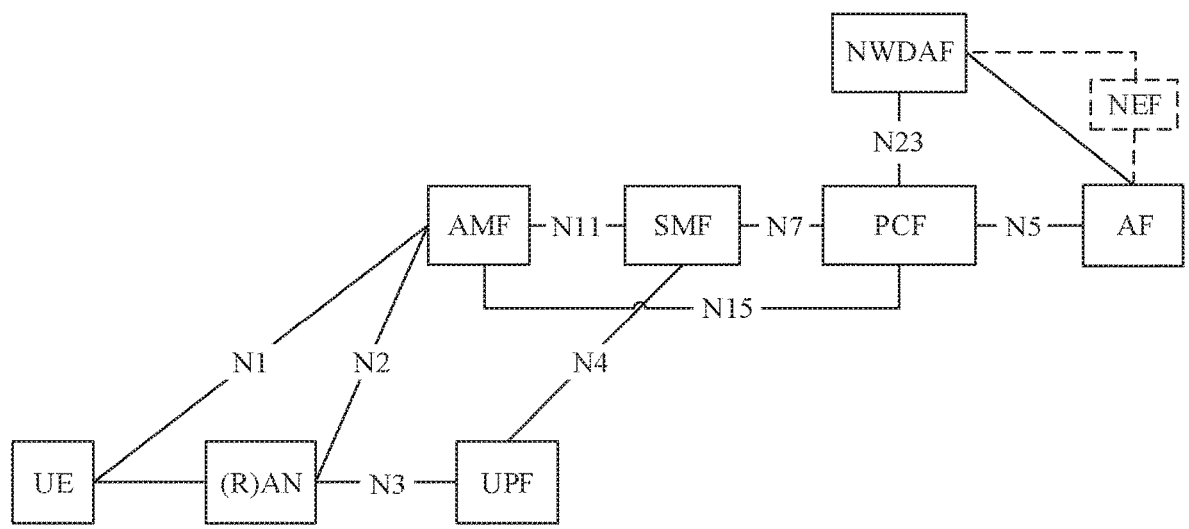
FIG. 1 is a schematic architectural diagram of a communications system according to an embodiment of this application.

FIG. 1 is a schematic architectural diagram of a communications system according to an embodiment of this application. The communications system includes a data analytics network element, an application function (AF) network element (also including a service server), a core network element, an access network element, a terminal device, and a network capability exposure (NEF) network element. The data analytics network element may be a network data analytics function network element (NWDAF). The core network element may include a policy control function (PCF) network element, a session management function (SMF) network element, an access and mobility management function (AMF) network element, and a user plane function (UPF) network element.

The NWDAF network element is connected to the PCF network element through an N23 interface, and the NWDAF can provide a data analysis result to the PCF. The PCF is connected to the AF network element through an N5 interface, is connected to the SMF network element through an N7 interface, and is connected to the AMF network element through an N15 interface. The PCF may dynamically formulate a QoS policy, and distribute a corresponding policy to network elements such as the SMF, the AMF, the UPF, an AN, and UE. The UPF is connected to the SMF network element through an N4 interface, and is connected to the AN element through an N3 interface. The AN is connected to the AMF network element through an N2 interface. The UE is connected to the AMF network element through an N interface.

It may be understood that in the communications system shown in FIG. 1, functions and interfaces of the network elements are merely examples. Not all functions are necessary when the network elements are applied to the embodiments of this application.

The terminal device includes but is not limited to: UE, a subscriber unit, a subscriber station, a mobile station, a mobile console, a remote station, a remote terminal device, a mobile terminal device, a user terminal device, a wireless communications device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, a processing device connected to a wireless modem, a vehicle-mounted device, a wearable device, a terminal device in the internet of things, a home appliance, a virtual reality device, a terminal device in a 5G network, a terminal device in a future evolved public land mobile network (PLMN), or the like.

An access network device may be a device that communicates with the terminal device. The access network device may provide communication coverage for a particular geographical area, and may communicate with a terminal device located in the coverage area (cell). The access network device may communicate with any quantity of terminal devices. There may be a plurality of air interface connections between the access network device and the terminal device. For example, there are two air interface connections between the access network device and the terminal device, and the two air interface connections are respectively used to transmit a data stream A and a data stream B. The access network device may support communication protocols of different standards, or may support different communication modes. For example, the access network device may be an evolved NodeB (eNodeB), a wireless fidelity access point (Wi-Fi AP), a worldwide interoperability for microwave access base station (WiMAX BS), or a radio controller in a cloud radio access network (CRAN), or the network device may be an access network device in a future 5G network or an access network device in a future evolved PLMN.

The PCF network element has a policy control decision function, and provides a policy for a network. The AMF network element is configured to perform mobility management, lawful interception, access authorization, authentication, and the like. The SMF network element is configured to implement session and bearer management, address assignment, and the like.

The data analytics network element can provide a network data analysis result to the PCF, for example, provide at least one piece of QoS description information.

In the embodiments of this application, all or some network elements of the access network device and a core network may belong to a 3rd generation partnership project (3GPP) network, or may belong to a non-3GPP network, for example, an intranet. All or some network elements of the core network may be physical entity network elements, or may be virtualized network elements. This is not limited herein.

The term "and/or" in the embodiments of this application describes only an association relationship for describing associated objects and represents that three relationships may exist. For example, A and/or B may represent the following cases: Only A exists, both A and B exist, and only B exists. In addition, in the descriptions of this application, "a plurality of" means two or more than two.

In the embodiments of this application, that a network element (for example, a network element A) obtains information from another network element (for example, a network element B) may mean that the network element A directly receives the information from the network element B, or may mean that the network element A receives the information from the network element B by using another network element (for example, a network element C). When the network element A receives information from the network element B by using the network element C, the network element C may transparently transmit the information, or may process the information, for example, add the information to different messages for transmission, or filter the information and send only filtered information to the network element A. Similarly, in the embodiments of this application, that the network element A sends information to the network element B may mean that the network element A directly sends the information to the network element B, or may mean that the network element A sends the information to the network element B by using another network element (for example, the network element C).

Figures 1, 2:
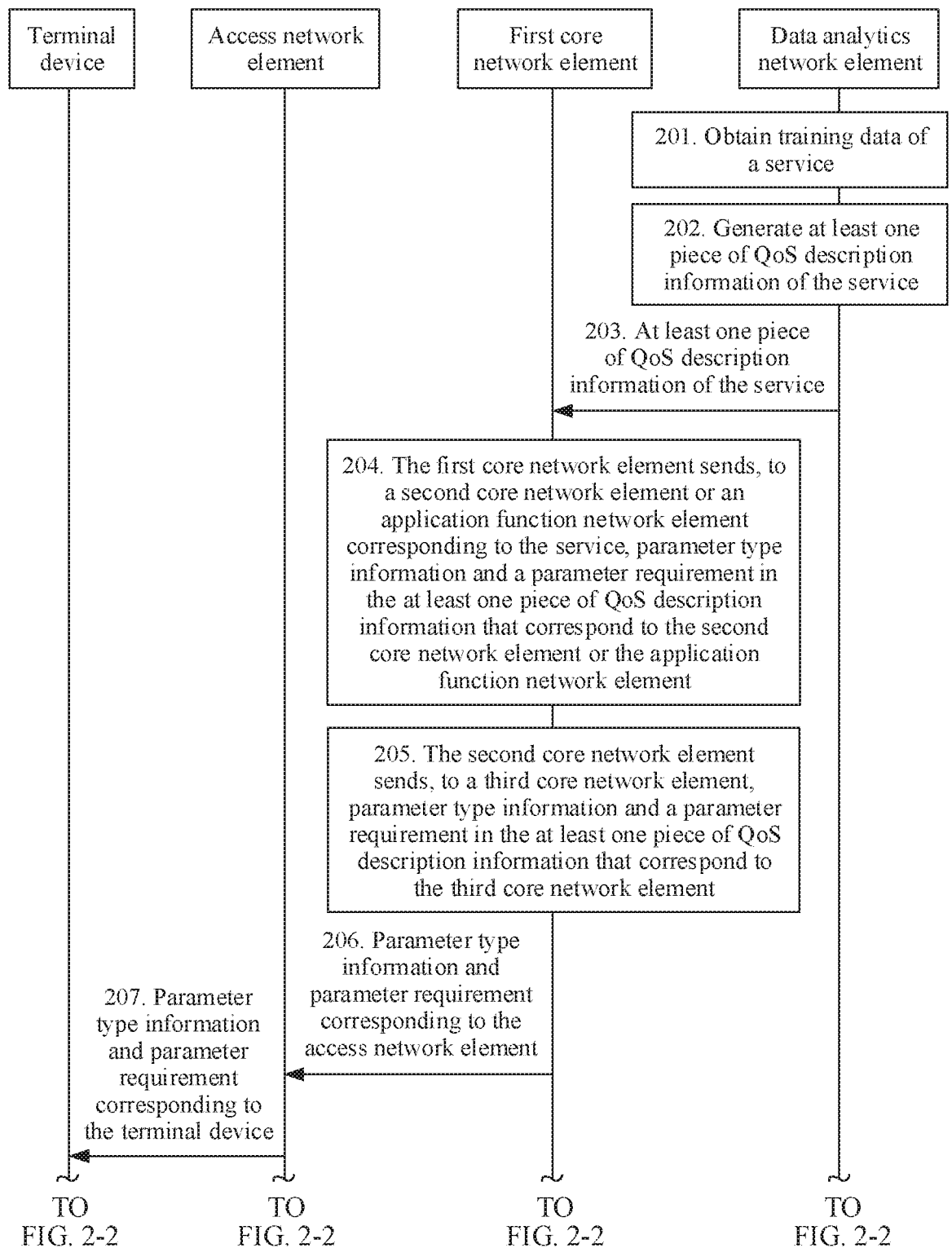
Figure 2:
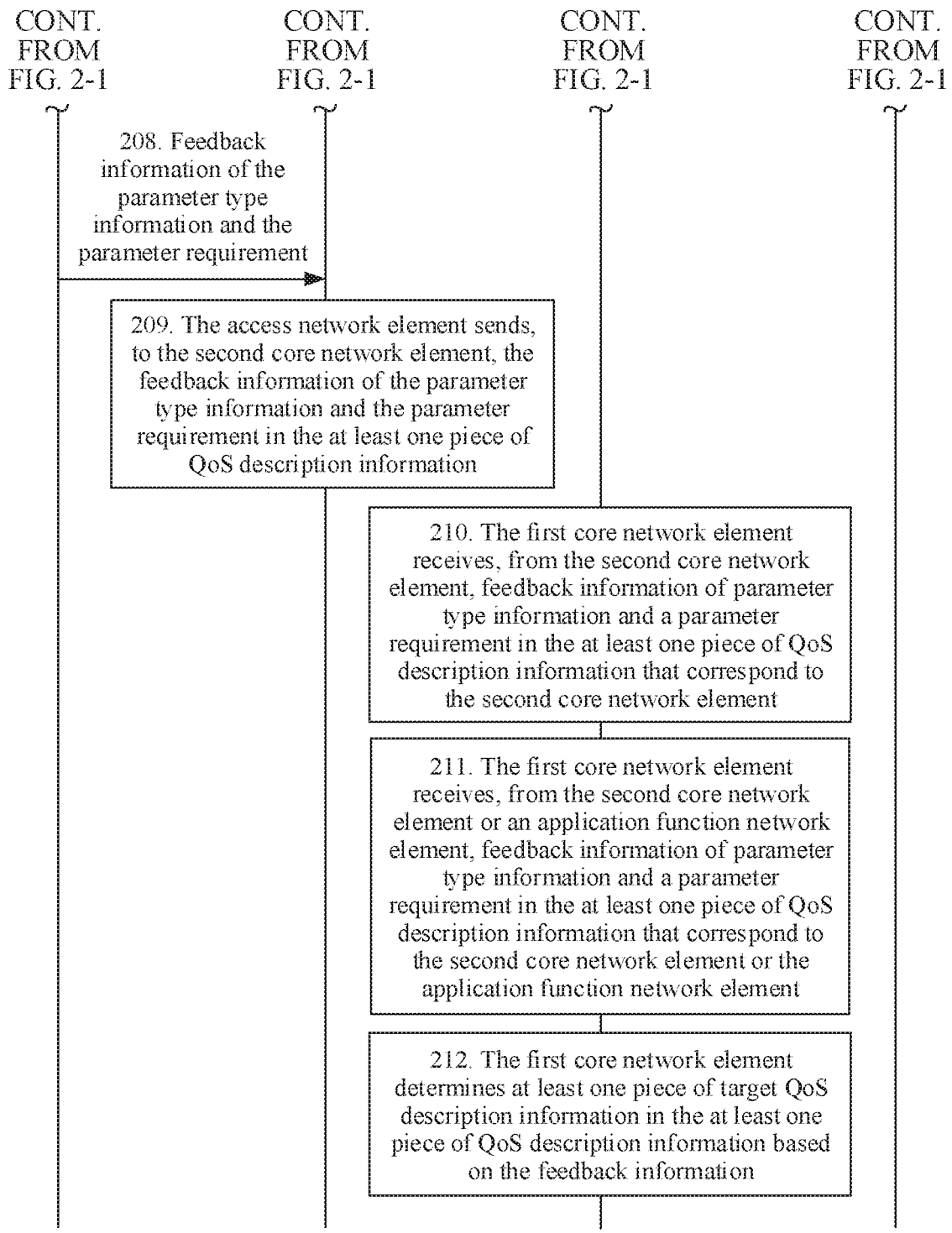

An embodiment of this application provides a method for determining QoS description information. As shown in FIG. 2-1 and FIG. 2-2, the method includes steps 201 to 212. The method for determining QoS description information includes a method for transmitting QoS description information.

201. A data analytics network element obtains training data of a service.

The data analytics network element may be the NWDAF network element in FIG. 1. The data analytics network element may alternatively be another network 3' element having a network data analysis function. This is not limited herein.

The data analytics network element obtains the training data of the service, and obtains at least one piece of QoS description information of the service from the training data of the service. The service may include a voice service, an ultra-reliable and low-latency communication (URLLC) service, an IP multimedia subsystem (IMS) video service, a vehicle to everything (V2X) service, a voice over LTE (VoLTE) service, or the like. This is not limited in this application. The training data of the service includes at least one of the following: data provided by a service server of the service, data provided by a network, and data provided by a terminal device.

The service server of the service may be at least one of the following servers: an operator managed and controlled AF (for example, a P-CSCF, a proxy-call session control function or a proxy-call session control function network element), a third-party application (App) server, an OTT (over the top) server, or a vertical industry control center. The data provided by the service server may include at least one of a service identifier, a service type, service experience information, service description information, an internet protocol (IP) 5-tuple of a service user, an amount of user plane data, a user plane data packet interval, a service start time, a service end time, and the like.

The data provided by the network may include service-related network data provided by a telecommunications network device, for example, at least one of an address of a terminal device executing the service, a cell identity (Cell ID), a tunnel endpoint identifier (TEID), time information, a network congestion status, a network resource status (for example, RUCI (RAN user plane congestion information)), a type or an identifier of a network element, a QoS indication, a data network name (DNN), real-time radio channel quality (for example, channel quality information (CQI), a reference signal received power (RSRP), reference signal received quality (RSRQ), or a signal to interference plus noise ratio (SINR)), a service handover threshold, a filtering coefficient, an antenna tilt, a carrier frequency, a carrier, a packet loss rate, a guaranteed bit rate (GBR), a maximum bit rate (MBR), and an aggregate maximum bit rate (AMBR). The telecommunications network device may include at least one of the following devices: an access network device, a control plane function network element (for example, an AMF, an SMF or a PCF), a UPF, a network management network element (for example, a business support system (BSS), an operation support system (OSS), a management support system (MSS)), or a unified data management (UDM).

The data provided by the terminal device may include at least one of the following data: identifier information of the terminal device, service-related IP address/port information, a type of the terminal device, a capability of the terminal device, an operating system version, a temperature of the terminal device, a quantity of electricity of the terminal device, cell radio channel quality (for example, an RSRP, RSRQ, or an SINR) measured by the terminal device, congestion information, and the like.

It should be noted that the foregoing network elements and data types are merely examples for description. This is not limited in this application.

202. The data analytics network element generates at least one piece of QoS description information of the service.

After collecting service data, network data, and terminal data, the data analytics network element may obtain different QoS description information of a service based on big data analysis. Specifically, a problem that an NWDAF obtains a parameter requirement in the QoS description information of the service may be converted into a multi-objective optimization problem A specific procedure is as follows:

First, the NWDAF may perform big data analysis to obtain a service experience model, as shown in formula (1):

$$h(x)=w_0x_0+w_1x_1+w_2x_2+w_3x_3+\ldots+w_Dx_D \quad (1)$$

where h(x) indicates service experience, for example, a MOS (Mean Opinion Score, mean opinion score) of a voice service, a vMOS (Video MOS, video mean opinion score) of a video service, or a quantity of times of successful payment of a payment service;

$X=(x_0, x_1, x_2, x_3, \ldots, x_D)$ is used to indicate a normalized eigenvector, including a terminal type, a time, a data packet feature, a reference signal received power (Reference Signal Received Power, RSRP), a packet delay budget (Packet Delay Budget, PDB), and the like;

$W=(w_0, w_1, w_2, w_3, \ldots, w_D)$ is a parameter vector; and D indicates an eigenvector dimension.

Then, a constraint may be determined. For example, it may be assumed that a target MOS of VoLTE (Voice Over LTE, which is an LTE-based IMS (IP Multimedia Subsystem, IP multimedia subsystem) voice service) is at least 3.0, and the obtained constraint is shown in formula (2). In addition, each $x_i$ (i=1, ..., D) has constraint space. For example, the RSRP is in a range of [−140, −70] dBm. Formula (2) is as follows:

$$0.6=w_0x_0+w_1x_1+w_2x_2+w_3x_3+\ldots+w_Dx_D \quad (2)$$

Then, a target function set is determined. For example, a handover threshold of a service is determined. A smaller handover threshold is better, that is, a smaller RSRP is set as better, that is, $\min f_1(X)=x_p$, where $x_p$ indicates an RSRP parameter requirement, that is, a specific value. For another example, latency of a service is determined. If larger latency is better, a larger PDB is better, that is, $\min f_2(X)=-x_q$, where $x_q$ indicates a PDB parameter requirement, that is, a specific value.

For example, a mathematical formula for a multi-objective optimization problem is described in (3):

$$\min(f_1(x), f_2(x), \ldots, f_k(x)) \quad (3)$$

where s.t. $0.6=w_0x_0+w_1x_1+w_2x_2+w_3x_3+\ldots+w_Dx_D$; $x_i(i=1, \ldots, D) \in X$ A method for resolving a multi-objective optimization problem is, for example, but not limited to, a genetic algorithm (GA). It should be noted that a result of multi-objective optimization may be a group of solutions, that is, there may be a plurality of parameter requirements or a plurality of sets of parameter requirements that meet an experience objective of a same service. To be specific, for a same service, at least one piece of QoS description information may be obtained through big data analysis, and each piece of QoS description information can meet the experience objective of the service.

It should be noted that each piece of the at least one piece of QoS description information may include a QoS parameter type set and a QoS parameter requirement set. It should be noted that the at least one piece of QoS description information may be a set, a matrix, a list (table), an image, a function, a description file, or another form. This is not limited in this application.

The QoS parameter type set includes specific types or names of one or more QoS parameters, and each QoS parameter may correspond to one parameter type or name.

The QoS parameter requirement set includes specific value requirements of one or more QoS parameters. Types of the specific value requirements include but are not limited to a numeric type, a date type, a time type, and a Boolean type. It should be noted that, the specific value requirement may be an actual physical value of a parameter, or may be a value obtained after normalization processing is performed on a value of a parameter. Normalization processing is an operation of mapping a physical value of a parameter to fixed value space, for example, mapping a physical data value of each feature to the fixed value space by using a maximum minimum value normalization method, a Z-Score normalization method, or the like. This processing not only facilitates improvement of a model training convergence speed in a big data analysis process, but also provides a feature data transmission manner. For example, the QoS parameter requirement set includes at least one of the following: a time information requirement, a GFBR (guaranteed flow bit rate) requirement, an MFBR (maximum flow bit rate) requirement, an average time window size requirement, and a normalization feature requirement. In a possible implementation, the QoS parameter requirement set may further include one or more of a latency requirement, a data packet loss rate requirement, a data packet size requirement, a coding scheme requirement, a jitter requirement, a priority requirement, an allocation/retention priority (ARP) requirement, a data packet arrival rate requirement, a session aggregate maximum bit rate (session-AMBR) requirement, a user equipment aggregate maximum bit rate (UE-AMBR) requirement, an uplink/downlink maximum packet loss rate (UL/DL Max PLR) requirement, a traffic activation rate requirement, and the like.

In a possible implementation, each piece of the at least one piece of QoS description information may correspond to one QoS description information index, for example, a numerical symbol, and the numerical symbol may be used to represent or index one piece of corresponding QoS description information.

In a possible implementation, each piece of the at least one piece of QoS description information includes network element information. The network element information may be in a form of a set. In other words, each piece of QoS description information includes a network element information set. The network element information set includes one or more pieces of network element information. For each piece of QoS description information, each piece of network element information is used to indicate a network element corresponding to parameter type information and a parameter requirement in the QoS description information. The network element information may include network element type information or identifier information. The network element information is used to indicate one network element or one type of network element to which each QoS parameter requirement can be applied. For example, the packet loss rate requirement and the average window size requirement are applied to the UPF. To be specific, the UPF may determine, based on UPF information (an identifier or a type of the UPF) in the network element information set, that a QoS parameter requirement related to the UPF in each piece of QoS description information includes the packet loss rate requirement and the average window size requirement. Subsequently, the UPF only needs to determine whether a packet loss rate and an average window size of a current network (including the UPF) can satisfy the packet loss rate requirement and the average window size requirement in each piece of QoS description information, and the UPF does not need to identify or consider another QoS parameter requirement in the QoS description information. Therefore, the UPF may sift, from at least one piece of received QoS description information, zero, one, or more pieces of QoS description information whose packet loss rate requirement and average window size requirement can be satisfied. For another example, the time requirement is applied to the PCF. To be specific, the PCF may determine, based on PCF information in the network element information, that a QoS parameter requirement related to the PCF in each piece of QoS description information includes the time requirement. Subsequently, the PCF only needs to determine whether a current network time can satisfy the time requirement in each piece of QoS description information. Therefore, the PCF may sift, from the at least one piece of received QoS description information, zero, one, or more pieces of QoS description information whose time requirement can be satisfied. It should be noted that the network element information may indicate that the QoS parameter requirement is to be used or determined by a network element. For example, the network element information of the foregoing time requirement is the PCF, and a specific meaning is that the PCF is to determine or use the time requirement. For another example, assuming that a user position requirement is possibly used as a QoS parameter requirement in a piece of QoS description information and a network element corresponding to the user position requirement is an access network device, a specific meaning is that the access network device is to determine or use the user position requirement, but the user position requirement may not be an attribute requirement for an access network device. It should be noted that the network element information may be optional. For some existing QoS parameters, some network elements may actively identify that these QoS parameters belong to the network elements. For example, for a Max PLR parameter, the access network element may actively identify that the parameter is applied to the access network element, and does not need the network element information to indicate that the parameter belongs to the access network element.

For example, the data analytics network element may obtain, by using an existing big data learning and analysis method, the at least one piece of QoS description information of the service based on service data (for example, service experience) provided by the service server. For example, it is assumed that the service is a URLLC service, and service experience of the URLLC service is described by using a mean opinion score (MOS). A range of the MOS is [0, 5]. A larger value indicates better service experience of the URLLC service. As shown in Table 1, after analyzing training data of the URLLC service, the data analytics network element may obtain that a QoS parameter type set that affects the MOS of the URLLC service includes a Max PLR, a packet arrival rate, and a data bandwidth (Packet Bit Rate) of uplink and downlink data transmission, and therefore, obtains that the QoS parameter requirement set includes a Max PLR value requirement, a packet arrival rate value requirement, and a packet size value requirement, and obtains that the network element information set includes network element information respectively corresponding to the Max PLR, the packet arrival rate, and the packet size. For example, the Max PLR may correspond to an access network element (for example, a PCF/an SMF/an AMF/a UPF), the packet arrival rate may correspond to a core network element, and the packet bit rate may correspond to a terminal device. In other words, the network element information set includes the core network element, the access network element, and the terminal device.

TABLE 1

| Number | Access network element Max PLR | Core network element Packet arrival rate | Terminal device Packet bit rate (byte) |
| --- | --- | --- | --- |
| 0 | 1% | 95% | 200 |
| 1 | 3% | 98% | 200 |

Figure 2A:
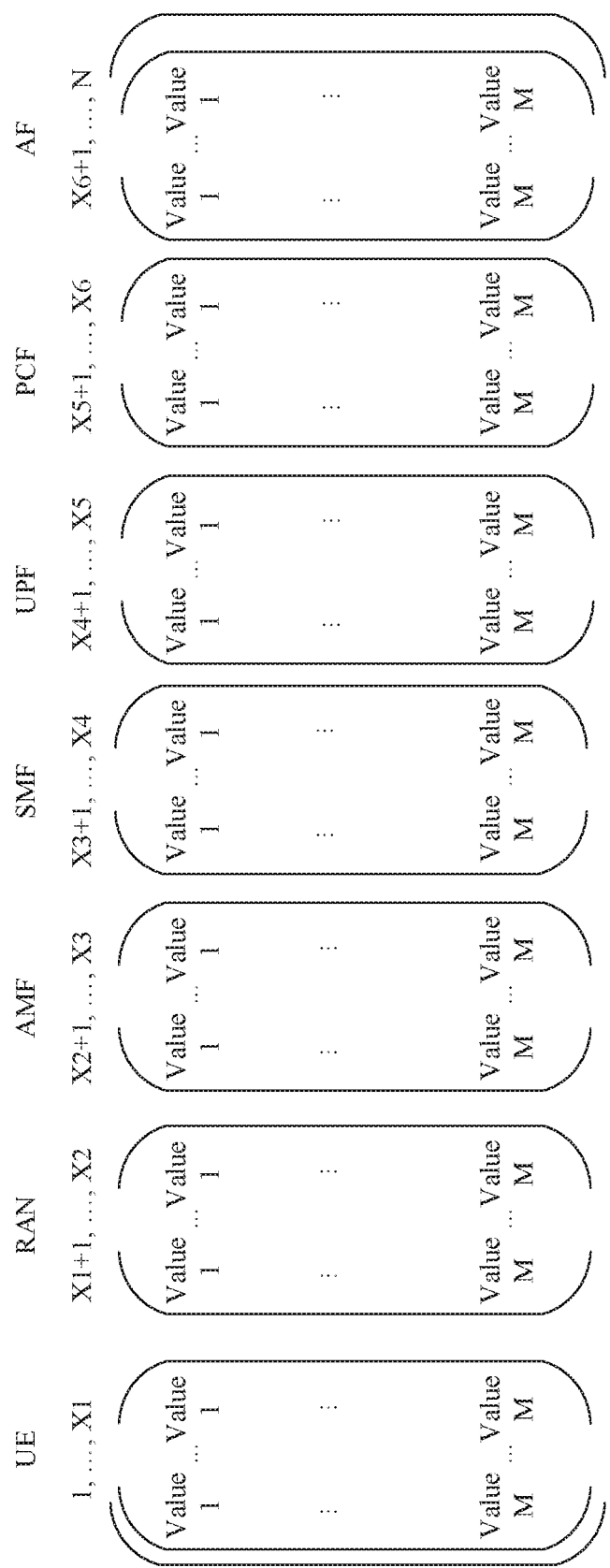
FIG. 2a is a schematic diagram of QoS description information according to an embodiment of this application.

For example, the at least one piece of QoS description information may be in a form of an M*N QoS matrix. As shown in FIG. 2a, parameter types related to UE correspond to columns 1, . . . , and X1; parameter types related to a RAN correspond to columns X1+1, . . . , and X2; parameter types related to an AMF correspond to columns X2+1, . . . , and X3; parameter types related to an SMF correspond to columns X3+1, . . . , and X4; parameter types related to a UPF correspond to columns X4+1, . . . , and X5; parameter types related to a PCF correspond to columns X5+1, . . . , and X6; and parameter types related to an AF correspond to columns X6+1, . . . , and N. Each parameter type of each network element may correspond to M values. It may be understood that the QoS matrix includes M rows to indicate that there are M pieces of QoS description information for one service, and N columns of the QoS matrix are used to indicate that each piece of QoS description information has N QoS parameter types. The location [i, j] represents a value of a $j^{th}$ QoS parameter type in an $i^{th}$ piece of QoS description information, where i is less than or equal to M, and j is less than or equal to N.

Figure 2B:
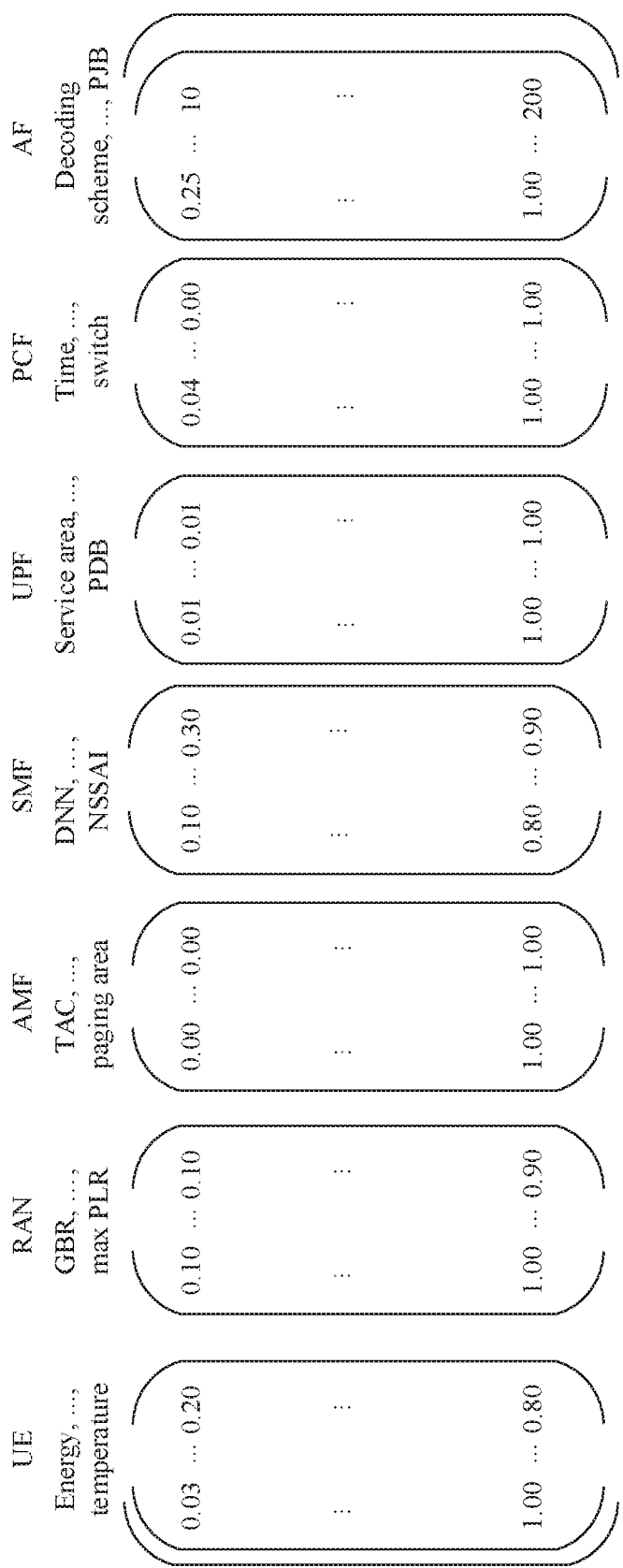
FIG. 2b is a schematic diagram of QoS description information according to an embodiment of this application.

For example, as shown in FIG. 2b, parameter types related to UE may include energy, . . . , and a temperature; parameter types related to a RAN may include a GBR (guaranteed bit rate), . . . , and a Max PLR (maximum packet loss rate); parameter types related to an AMF may include a TAC (type allocation code), . . . , and a paging area; parameter types related to an SMF may include a DNN (data network name), . . . , and NSSAI (network slice selection assistance information); parameter types related to a UPF may include a service area, . . . , and a PDB (packet delay budget); parameter types related to a PCF may include a time, . . . , and a switch; and parameter types related to an AF may include a coding scheme, a coding rate, . . . , and a PJB (packet jitter buffer). Each parameter type of each network element may correspond to a plurality of different parameter requirements, and the parameter requirements may be original values or may be represented by values obtained after normalization processing.

In a possible implementation, each piece of the at least one piece of QoS description information may correspond to one QoS policy in the network element (including the core network element or the access network element), the terminal device, or the service server. For example, the network element, the terminal device, or the service server may use the received QoS description information as a QoS policy, or may generate or map a corresponding QoS policy based on the QoS description information. The network element, the terminal device, or the service server may execute a corresponding QoS policy, for example, allocate a corresponding resource and/or perform corresponding threshold control based on a QoS policy requirement.

203. The data analytics network element sends the at least one piece of QoS description information of the service to a first core network element.

For example, as shown in Table 2, the at least one piece of QoS description information may be in a form of a list.

When the first core network element is a PCF, it is assumed that the PCF receives ten pieces of QoS description information of a voice service from an NWDAF, and the ten pieces of QoS description information may respectively correspond to numbers 1 to 10. A network element information set in each piece of QoS description information includes a PCF, an SMF, an AMF, a UPF, an AN, and UE. A QoS parameter type set corresponding to the PCF includes time information, a service coding type, and a service coding rate. A parameter type corresponding to the SMF may include a DNN and NSSAI. A parameter type corresponding to the AMF may include a TAC and a paging area. A parameter type set corresponding to the AN may include a data packet loss rate and latency. A parameter type set corresponding to the UE may include UE priority information and a UE type. Correspondingly, QoS parameter requirements corresponding to the PCF includes a time information requirement, a service coding type requirement, and a service coding rate requirement. Parameter types corresponding to the SMF may include a DNN requirement and an NSSAI requirement. Parameter types corresponding to the AMF may include a TAC requirement and a paging area requirement. A parameter type set corresponding to the AN may include a data packet loss rate requirement, a latency requirement, a start time requirement, and an end time requirement. A parameter type set corresponding to the UE may include a UE priority information requirement and a UE type requirement.

TABLE 2

| | PCF | | | SMF | | AMF | AN | | | UE | |
| --- | --- | --- | --- | --- | --- | --- | --- | --- | --- | --- | --- |
| Number | Time information | Service coding type | Service coding rate (Kbps) | DNN | NSSAI | TAC | Paging area | Data packet loss rate | Latency | UE priority | UE type |
| 1 | Daytime (06:00 to 18:00) | AMR-WB | 5 to 50 | 0.10 | 0.10 | 0.11 | 0.10 | 0% to 1% | 1 ns | 1 | iPhone5S |
| 2 | Daytime (06:00 to 18:00) | AMR-WB | 5 to 50 | 0.11 | 0.10 | 0.10 | 0.15 | 0% to 1% | 1 ns | 1 | iPhone7 |
| 3 | Daytime (06:00 to 18:00) | AMR-WB | 5 to 50 | 0.12 | 0.12 | 0.12 | 0.10 | 0% to 1% | 2 ns | 7 | iPhone5S |
| 4 | Daytime (06:00 to 18:00) | AMR-WB | 5 to 50 | 0.11 | 0.10 | 0.10 | 0.15 | 0% to 1% | 2 ns | 1 | iPhone5S |
| 5 | Daytime (06:00 to 18:00) | AMR-WB | 5 to 50 | 0.11 | 0.10 | 0.10 | 0.15 | 0% to 1% | 4 ns | 7 | iPhone8 |
| 6 | Daytime (06:00 to 18:00) | AMR-WB | 5 to 50 | 0.11 | 0.14 | 0.12 | 0.10 | 0% to 1% | 4 ns | 1 | iPhone5S |
| 7 | Daytime (06:00 to 18:00) | AMR-WB | 5 to 50 | 0.16 | 0.10 | 0.12 | 0.10 | 0% to 1% | 2 ns | 1 | iPhone5S |
| 8 | Daytime (06:00 to 18:00) | AMR-WB | 50 to 100 | 0.17 | 0.10 | 0.12 | 0.10 | 2% to 3% | 5 ns | 1 | iPhone6 |
| 9 | Nighttime (18:00 to 12:00) | EVS | 50 to 100 | 0.18 | 0.16 | 0.12 | 0.10 | 2% to 3% | 8 ns | 7 | iPhone5S |
| 10 | Nighttime (18:00 to 12:00) | AMR-WB | 50 to 100 | 0.19 | 0.10 | 0.12 | 0.10 | 2% to 3% | 2 ns | 7 | iPhone8 |

QoS parameter requirements of the SMF and the AMF are represented by values obtained after normalization processing, and a QoS parameter requirement of another network element is an original data value.

In a possible design, the data analytics network element sends initialized QoS opinion information to the first core network element, where the initialized QoS opinion information is generated by the data analytics network element based on the at least one piece of QoS description information, so that the first core network element and the like mark the initialized QoS opinion information in a subsequent step. For example, the initialized QoS opinion information is shown in Table 3, where all opinions corresponding to a parameter requirement of each network element may be initialized to 0.

allocation from the data analytics network element through the uniform northbound interface; or the service server requests service identifier information allocation from the NEF through the uniform northbound interface, and then the NEF requests service identifier information allocation from the data analytics network element. The service identifier information may alternatively be provided by another network element to the PCF. For example, in a session establishment process corresponding to the service, the SMF or the terminal device provides the service identifier information to the PCF. This is not limited herein. The service identifier information includes at least one of the following: a public land mobile network identifier PLMN ID, a service identifier service ID, and an analytic identifier Analytic ID.

TABLE 3

| | First core network element | | | | | AMF | AN | | UE | |
| --- | --- | --- | --- | --- | --- | --- | --- | --- | --- | --- |
| | | Service | Service | | | | Data | | | |
| | Time | coding | coding | SMF | | Paging | packet | | UE | UE |
| Number | information | type | rate (Kbps) | DNN | NSSAI | TAC | area | loss rate | Latency | priority | type |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 |

In a possible implementation, before sending the at least one piece of QoS description information to the first core network element, the data analytics network element receives, from the first core network element, a QoS description information request message of the service. The QoS description information request message is used to request at least one piece of QoS description information of the service, and the QoS description information request message includes service identifier information of the service. In a possible implementation, the QoS description information request message may further include identifier information of the terminal device executing the service, location information of the terminal device, a name of a data network in which the terminal device is located, and the like. In a possible design, before sending the QoS description information request message of the service to the data analytics network element, in a service establishment process, the first core network element receives an authentication authorization request message (for example, a policy authentication authorization request message) sent by the service server of the service, where the authentication authorization request message includes the service identifier information, and is used to indicate to establish the service corresponding to the service identifier information. The identifier information of the service may be centrally allocated by the data analytics network element to any type of service in advance and sent to a corresponding service server. The data analytics network element may communicate with the service server through an NEF, and the data analytics network element, the NEF, and the service server may communicate with each other through a uniform northbound interface. Specifically, the service server may request service identifier information In a possible implementation, the authentication authorization request message may further include other application layer information of the service, for example, bandwidth requirement description information, media type description information, and a media coding scheme.

In a possible implementation, if the data analytics network element receives, from the first core network element, the QoS description information request message of the service, the data analytics network element may send a QoS description information response message to the first core network element, where the QoS description information response message includes at least one piece of QoS description information of the service corresponding to the service identifier.

In a possible design, after obtaining the at least one piece of QoS description information of the service based on the training data, the data analytics network element may actively push the at least one piece of QoS description information of the service to the PCF. To be specific, the first core network element does not need to request the QoS description information from the data analytics network element. In addition, in a push process, the data analytics network element may further send, to the PCF, the service identifier information that is of the service and that corresponds to the at least one piece of QoS description information. In a possible implementation, the data analytics network element may select an occasion for active push, and may perform real-time push or offline push; and may perform single-service push, or multi-service batch push.

In a scenario in which the data analytics network element actively pushes the at least one piece of QoS description information to the PCF, the PCF may receive the authentication authorization request message sent by the service server or a service-related session policy control request message sent by a session management function network element, where the authentication authorization request message or the session policy control request message is used to request to establish a service-related dedicated bearer, a service-related dedicated QoS flow, or a service-related session. In a possible implementation, the authentication authorization request message includes the service identifier information and other application layer information, for example, a classifier identifier, bandwidth requirement description information, media type description information, and a media coding scheme. The session policy control request message includes the service identifier information and other network parameters, for example, user position information and user type information.

In addition, if the QoS description information does not include the network element information set, the data analytics network element may further send the network element information set to the first core network element while sending the at least one piece of QoS description information, or actively push the network element information set to the PCF. For example, the at least one piece of QoS description information and the network element information set are sent in a same message to the first core network element.

204. The first core network element sends, to a second core network element or an application function network element corresponding to the service, parameter type information and a parameter requirement in the at least one piece of QoS description information that correspond to the second core network element or the application function network element.

In a possible design, the first core network element receives, from the data analytics network element, the at least one piece of QoS description information corresponding to the service.

In a possible design, before sending, to the second core network element or the application function network element corresponding to the service, the parameter type information and the parameter requirement in the at least one piece of QoS description information that correspond to the second core network element or the application function network element, the first core network element determines information indicating whether the first core network element satisfies parameter type information and a parameter requirement in the at least one piece of QoS description information that correspond to the first core network element.

That the first core network element satisfies the parameter type information and the parameter requirement in the at least one piece of QoS description information that correspond to the first core network element may include that an attribute condition of the first core network element can satisfy the parameter type information and the parameter requirement in the at least one piece of QoS description information that correspond to the first core network element, or may include that a parameter (for example, a time or a service coding scheme) related to the first core network element can satisfy the parameter type information and the parameter requirement in the at least one piece of QoS description information that correspond to the first core network element. For example, when the first core network element is an SMF, for each parameter requirement for the SMF in each piece of QoS description information, that the SMF satisfies the parameter requirement means that the SMF determines that the parameter requirement conforms to a current actual value of the service. For example, when a parameter type for an SMF in one piece of QoS description information is a data network name (DNN), and a parameter requirement corresponding to the DNN is an IMS DNN, if the SMF determines that a DNN in which a service is currently located is the IMS DNN, the SMF satisfies the parameter requirement. When a parameter type for the SMF in one piece of QoS description information is NSSAI, and a parameter requirement corresponding to the NSSAI is an enhanced mobile broadband (eMBB) slice, if the SMF determines that the NSSAI in which the service is currently located is the eMBB slice, the SMF satisfies the parameter requirement. Similarly, in a subsequent step in this application, that another network element satisfies parameter type information and a parameter requirement in at least one piece of QoS description information also has a same meaning. For details, refer to the description that the first core network element satisfies the parameter type information and the parameter requirement in the at least one piece of QoS description information that correspond to the first core network element.

In a possible design, the first core network element sends, to the second core network element corresponding to the service, the parameter type information and the parameter requirement in the at least one piece of QoS description information that correspond to the second core network element and the information indicating whether the first core network element satisfies the parameter type information and the parameter requirement in the at least one piece of QoS description information that correspond to the first core network element.

In a possible design, the first core network element sends, to the second core network element corresponding to the service, the parameter type information and the parameter requirement in the at least one piece of QoS description information that correspond to the second core network element, the information indicating whether the first core network element satisfies the parameter type information and the parameter requirement in the at least one piece of QoS description information that correspond to the first core network element, and information indicating whether the application function network element satisfies the parameter type information and the parameter requirement in the at least one piece of QoS description information that correspond to the application function network element.

In a possible design, the first core network element sends, to the application function network element corresponding to the service, the parameter type information and the parameter requirement in the at least one piece of QoS description information that correspond to the application function network element and the information indicating whether the first core network element satisfies the parameter type information and the parameter requirement in the at least one piece of QoS description information that correspond to the first core network element.

In a possible design, the first core network element sends, to the application function network element corresponding to the service, the parameter type information and the parameter requirement in the at least one piece of QoS description information that correspond to the application function network element, the information indicating whether the first core network element satisfies the parameter type information and the parameter requirement in the at least one piece of QoS description information that correspond to the first core network element, and information indicating whether the second core network element satisfies the parameter type information and the parameter requirement in the at least one piece of QoS description information that correspond to the second core network element.

In a possible design, the first core network element sends, to the second core network element, the parameter type information and the parameter requirement in the at least one piece of QoS description information that correspond to the second core network element and parameter type information and a parameter requirement in the at least one piece of QoS description information that correspond to at least one of a third core network element, an access network element, and a terminal device.

In a possible design, the first core network element sends, to the second core network element, the parameter type information and the parameter requirement in the at least one piece of QoS description information that correspond to the second core network element, the parameter type information and the parameter requirement in the at least one piece of QoS description information that correspond to the at least one of the first core network element, the third core network element, the access network element, and the terminal device, and the information indicating whether the first core network element satisfies the parameter type information and the parameter requirement in the at least one piece of QoS description information that correspond to the first core network element.

In a possible design, the first core network element sends, to the second core network element, the parameter type information and the parameter requirement in the at least one piece of QoS description information that correspond to the second core network element, the parameter type information and the parameter requirement in the at least one piece of QoS description information that correspond to the at least one of the first core network element, the third core network element, the access network element, and the terminal device, the information indicating whether the first core network element satisfies the parameter type information and the parameter requirement in the at least one piece of QoS description information that correspond to the first core network element, and the information indicating whether the application function network element satisfies the parameter type information and the parameter requirement in the at least one piece of QoS description information that correspond to the application function network element.

In a possible design, the first core network element sends, to the application function network element, the parameter type information and the parameter requirement in the at least one piece of QoS description information that correspond to the application function network element, parameter type information and a parameter requirement in the at least one piece of QoS description information that correspond to at least one of the first core network element, the second core network element, the third core network element, the access network element, and the terminal device, and the information indicating whether the first core network element satisfies the parameter type information and the parameter requirement in the at least one piece of QoS description information that correspond to the first core network element.

In a possible design, the first core network element sends, to the application function network element, the parameter type information and the parameter requirement in the at least one piece of QoS description information that correspond to the application function network element, parameter type information and a parameter requirement in the at least one piece of QoS description information that correspond to at least one of the first core network element, the second core network element, the third core network element, the access network element, and the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, information indicating whether the third core network element satisfies parameter type information and a parameter requirement in the at least one piece of QoS description information that correspond to the third core network element, information indicating whether the access network element satisfies parameter type information and a parameter requirement in the at least one piece of QoS description information that correspond to the access network element, and information indicating whether the terminal device satisfies parameter type information and a parameter requirement in the at least one piece of QoS description information that correspond to the terminal device.

205. The second core network element sends, to the third core network element corresponding to the service, the parameter type information and the parameter requirement in the at least one piece of QoS description information that correspond to the third core network element.

The second core network element receives, from the first core network element, the parameter type information and the parameter requirement in the at least one piece of QoS description information of the service that correspond to the second core network element.

In a possible design, the second core network element receives, from the first core network element, the parameter type information and the parameter requirement in the at least one piece of QoS description information of the service that correspond to the second core network element, and the parameter type information and the parameter requirement in the at least one piece of QoS description information that correspond to the at least one of the third core network element, the access network element, and the terminal device.

In a possible design, the second core network element receives, from the first core network element, the parameter type information and the parameter requirement in the at least one piece of QoS description information of the service that correspond to the second core network element and the information indicating whether the first core network element satisfies the parameter type information and the parameter requirement in the at least one piece of QoS description information that correspond to the first core network element.

In a possible design, the second core network element receives, from the first core network element, the parameter type information and the parameter requirement in the at least one piece of QoS description information of the service that correspond to the second core network element, the parameter type information and the parameter requirement in the at least one piece of QoS description information that correspond to the at least one of the third core network element, the access network element, and the terminal device, and the information indicating whether the first core network element satisfies the parameter type information and the parameter requirement in the at least one piece of QoS description information that correspond to the first core network element.

In a possible design, the second core network element receives, from the first core network element, the parameter type information and the parameter requirement in the at least one piece of QoS description information of the service that correspond to the second core network element, the parameter type information and the parameter requirement in the at least one piece of QoS description information that correspond to the at least one of the third core network element, the access network element, and the terminal device, the information indicating whether the first core network element satisfies the parameter type information and the parameter requirement in the at least one piece of QoS description information that correspond to the first core network element, and the information indicating whether the application function network element satisfies the parameter type information and the parameter requirement in the at least one piece of QoS description information that correspond to the application function network element.

In a possible design, the second core network element sends, to the third core network element, the parameter type information and the parameter requirement in the at least one piece of QoS description information that correspond to the third core network element and the information indicating whether the second core network element satisfies the parameter type information and the parameter requirement in the at least one piece of QoS description information that correspond to the second core network element.

In a possible design, the second core network element sends, to the third core network element, the parameter type information and the parameter requirement in the at least one piece of QoS description information that correspond to the third core network element, the information indicating whether the second core network element satisfies the parameter type information and the parameter requirement in the at least one piece of QoS description information that correspond to the second core network element, and the information indicating whether the first core network element satisfies the parameter type information and the parameter requirement in the at least one piece of QoS description information that correspond to the first core network element.

In a possible design, the second core network element sends, to the third core network element, the parameter type information and the parameter requirement in the at least one piece of QoS description information that correspond to the third core network element, and parameter type information and a parameter requirement in the at least one piece of QoS description information that correspond to at least one of the access network element and the terminal device.

In a possible design, the second core network element sends, to the third core network element, the parameter type information and the parameter requirement in the at least one piece of QoS description information that correspond to the third core network element, parameter type information and a parameter requirement in the at least one piece of QoS description information that correspond to at least one of the access network element and the terminal device, the information indicating whether the first core network element satisfies the parameter type information and the parameter requirement in the at least one piece of QoS description information that correspond to the first core network element, and the information indicating whether the second core network element satisfies the parameter type information and the parameter requirement in the at least one piece of QoS description information that correspond to the second core network element.

In a possible design, the second core network element sends, to the third core network element, the parameter type information and the parameter requirement in the at least one piece of QoS description information that correspond to the third core network element, parameter type information and a parameter requirement in the at least one piece of QoS description information that correspond to at least one of the access network element and the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, and the information indicating whether the application function network element satisfies the parameter type information and the parameter requirement in the at least one piece of QoS description information that correspond to the application function network element.

206. The second core network element sends, to the access network element, the parameter type information and the parameter requirement in the at least one piece of QoS description information that correspond to the access network element.

The second core network element receives, from the third core network element, the parameter type information and the parameter requirement in the at least one piece of QoS description information of the service that correspond to the second core network element.

In a possible design, the second core network element receives, from the third core network element, the information indicating whether the third core network element satisfies the parameter type information and the parameter requirement in the at least one piece of QoS description information that correspond to the third core network element.

In a possible design, the second core network element receives, from the third core network element, the parameter type information and the parameter requirement in the at least one piece of QoS description information of the service that correspond to the second core network element, and the parameter type information and the parameter requirement in the at least one piece of QoS description information that correspond to at least one of the access network element and the terminal device.

In a possible design, the second core network element receives, from the third core network element, the parameter type information and the parameter requirement in the at least one piece of QoS description information of the service that correspond to the second core network element, the parameter type information and the parameter requirement in the at least one piece of QoS description information that correspond to at least one of the access network element and the terminal device, the information indicating whether the first core network element satisfies the parameter type information and the parameter requirement in the at least one piece of QoS description information that correspond to the first core network element, and the information indicating whether the third core network element satisfies the parameter type information and the parameter requirement in the at least one piece of QoS description information that correspond to the third core network element.

In a possible design, the second core network element receives, from the third core network element, the parameter type information and the parameter requirement in the at least one piece of QoS description information of the service that correspond to the second core network element, the parameter type information and the parameter requirement in the at least one piece of QoS description information that correspond to the at least one of the access network element and the terminal device, the information indicating whether the first core network element satisfies the parameter type information and the parameter requirement in the at least one piece of QoS description information that correspond to the first core network element, the information indicating whether the third core network element satisfies the parameter type information and the parameter requirement in the at least one piece of QoS description information that correspond to the third core network element, and the information indicating whether the application function network element satisfies the parameter type information and the parameter requirement in the at least one piece of QoS description information that correspond to the application function network element.

In a possible design, the second core network element sends, to the access network element, the parameter type information and the parameter requirement in the at least one piece of QoS description information that correspond to the access network element and the information indicating whether the second core network element satisfies the parameter type information and the parameter requirement in the at least one piece of QoS description information that correspond to the second core network element.

In a possible design, the second core network element sends, to the access network element, the parameter type information and the parameter requirement in the at least one piece of QoS description information that correspond to the access network element, the parameter type information and the parameter requirement in the at least one piece of QoS description information that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, and the information indicating whether the third core network element satisfies the parameter type information and the parameter requirement in the at least one piece of QoS description information that correspond to the third core network element.

In a possible design, the second core network element sends, to the access network element, the parameter type information and the parameter requirement in the at least one piece of QoS description information that correspond to the access network element, the parameter type information and the parameter requirement in the at least one piece of QoS description information that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, and the information indicating whether the application function network element satisfies the parameter type information and the parameter requirement in the at least one piece of QoS description information that correspond to the application function network element.

207. The access network element sends, to the terminal device corresponding to the service, the parameter type information and the parameter requirement in the at least one piece of QoS description information that correspond to the terminal device.

The access network element receives, from the second core network element, the parameter type information and the parameter requirement in the at least one piece of QoS description information of the service that correspond to the access network element.

In a possible design, the access network element receives, from the second core network element, the parameter type information and the parameter requirement in the at least one piece of QoS description information of the service that correspond to the second core network element and the parameter type information and the parameter requirement in the at least one piece of QoS description information that correspond to the terminal device.

In a possible design, the access network element receives, from the second core network element, the parameter type information and the parameter requirement in the at least one piece of QoS description information that correspond to the access network element and the information indicating whether the second core network element satisfies the parameter type information and the parameter requirement in the at least one piece of QoS description information that correspond to the second core network element.

In a possible design, the access network element receives, from the second core network element, the parameter type information and the parameter requirement in the at least one piece of QoS description information of the service that correspond to the access network element, the parameter type information and the parameter requirement in the at least one piece of QoS description information that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, and the information indicating whether the third core network element satisfies the parameter type information and the parameter requirement in the at least one piece of QoS description information that correspond to the third core network element.

In a possible design, the access network element receives, from the second core network element, the parameter type information and the parameter requirement in the at least one piece of QoS description information of the service that correspond to the access network element, the parameter type information and the parameter requirement in the at least one piece of QoS description information that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, and the information indicating whether the application function network element satisfies the parameter type information and the parameter requirement in the at least one piece of QoS description information that correspond to the application function network element.

In a possible design, the access network element sends, to the terminal device, the parameter type information and the parameter requirement in the at least one piece of QoS description information that correspond to the terminal device and the information indicating whether the access network element satisfies the parameter type information and the parameter requirement in the at least one piece of QoS description information that correspond to the access network element.

In a possible design, the access network element sends, to the terminal device, the parameter type information and the parameter requirement in the at least one piece of QoS description information that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, and the information indicating whether the access network element satisfies the parameter type information and the parameter requirement in the at least one piece of QoS description information that correspond to the access network element.

In a possible design, the access network element sends, to the terminal device, the parameter type information and the parameter requirement in the at least one piece of QoS description information that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the application function network element satisfies the parameter type information and the parameter requirement in the at least one piece of QoS description information that correspond to the application function network element.

208. The terminal device sends, to the access network element, feedback information of the parameter type information and the parameter requirement in the at least one piece of QoS description information.

The terminal device receives, from the access network element, the parameter type information and the parameter requirement in the at least one piece of QoS description information of the service that correspond to the terminal device.

In a possible implementation, the terminal device receives, from the access network element, the parameter type information and the parameter requirement in the at least one piece of QoS description information that correspond to the terminal device and the information indicating whether the access network element satisfies the parameter type information and the parameter requirement in the at least one piece of QoS description information that correspond to the access network element.

In a possible design, the terminal device receives, from the access network element, the parameter type information and the parameter requirement in the at least one piece of QoS description information of the service that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, and the information indicating whether the access network element satisfies the parameter type information and the parameter requirement in the at least one piece of QoS description information that correspond to the access network element.

In a possible design, the terminal device receives, from the access network element, the parameter type information and the parameter requirement in the at least one piece of QoS description information of the service that correspond to the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the application function network element satisfies the parameter type information and the parameter requirement in the at least one piece of QoS description information that correspond to the application function network element.

In a possible design, the terminal device sends, to the access network element, the information indicating whether the terminal device satisfies the parameter type information and the parameter requirement in the at least one piece of QoS description information that correspond to the terminal device.

In a possible design, the terminal device sends, to the access network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the terminal device satisfies the parameter type information and the parameter requirement in the at least one piece of QoS description information that correspond to the terminal device.

In a possible design, the terminal device sends, to the access network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

209. The access network element sends, to the second core network element, the feedback information of the parameter type information and the parameter requirement in the at least one piece of QoS description information.

The access network element receives, from the terminal device, feedback information of the parameter type information and the parameter requirement in the at least one piece of QoS description information.

In a possible design, the access network element receives, from the terminal device, the information indicating whether the terminal device satisfies the parameter type information and the parameter requirement in the at least one piece of QoS description information that correspond to the terminal device.

In a possible design, the access network element receives, from the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the terminal device satisfies the parameter type information and the parameter requirement in the at least one piece of QoS description information that correspond to the terminal device.

In a possible design, the access network element receives, from the terminal device, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

In a possible design, the access network element sends, to the second core network element, the information indicating whether the access network element satisfies the parameter type information and the parameter requirement in the at least one piece of QoS description information that correspond to the access network element.

The access network element sends, to the second core network element, the feedback information of the parameter type information and the parameter requirement in the at least one piece of QoS description information and feedback information of the parameter type information and the parameter requirement in the at least one piece of QoS description information that correspond to the terminal device.

In a possible design, the access network element sends, to the second core network element, the feedback information of the parameter type information and the parameter requirement in the at least one piece of QoS description information and feedback information of the parameter type information and the parameter requirement in the at least one piece of QoS description information that correspond to the terminal device.

In a possible design, the access network element sends, to the second core network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the terminal device satisfies the parameter type information and the parameter requirement in the at least one piece of QoS description information that correspond to the terminal device.

In a possible design, the access network element sends, to the second core network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

In a possible design, the second core network element sends, to the first core network element, feedback information of the parameter type information and the parameter requirement in the at least one piece of QoS description information that correspond to the second core network element.

210. The first core network element receives, from the second core network element, feedback information of the parameter type information and the parameter requirement in the at least one piece of QoS description information that correspond to the second core network element.

In a possible design, the second core network element receives, from the third core network element, feedback information of the parameter type information and the parameter requirement in the at least one piece of QoS description information.

In a possible design, the second core network element receives, from the third core network element, the information indicating whether the third core network element satisfies the parameter type information and the parameter requirement in the at least one piece of QoS description information that correspond to the third core network element.

In a possible design, the second core network element receives, from the access network element, feedback information of the parameter type information and the parameter requirement in the at least one piece of QoS description information.

In a possible design, the second core network element receives, from the access network element, the information indicating whether the access network element satisfies the parameter type information and the parameter requirement in the at least one piece of QoS description information that correspond to the access network element.

In a possible design, the second core network element receives, from the third core network element or the access network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the terminal device satisfies the parameter type information and the parameter requirement in the at least one piece of QoS description information that correspond to the terminal device.

In a possible design, the second core network element receives, from the third core network element or the access network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

In a possible design, the second core network element sends, to the first core network element, the information indicating whether the second core network element satisfies the parameter type information and the parameter requirement in the at least one piece of QoS description information that correspond to the second core network element.

In a possible design, the second core network element sends, to the first core network element, the feedback information of the parameter type information and the parameter requirement in the at least one piece of QoS description information that correspond to the second core network element and feedback information of the parameter type information and the parameter requirement in the at least one piece of QoS description information that correspond to at least one of the third core network element, the access network element, and the terminal device.

In a possible design, the second core network element sends, to the first core network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, and the information indicating whether the terminal device satisfies the parameter type information and the parameter requirement in the at least one piece of QoS description information that correspond to the terminal device.

In a possible design, the second core network element sends, to the first core network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

211. The first core network element receives, from the second core network element or the application function network element, feedback information of the parameter type information and the parameter requirement in the at least one piece of QoS description information that correspond to the second core network element or the application function network element.

The first core network element receives, from the second core network element, the information indicating whether the second core network element satisfies the parameter type information and the parameter requirement that are sent by the first core network element and that correspond to the second core network element.

In a possible design, the first core network element receives, from the second core network element, the information indicating whether the second core network element satisfies the parameter type information and the parameter requirement that are sent by the first core network element and that correspond to the second core network element and the information indicating whether the first core network element satisfies the parameter type information and the parameter requirement in the at least one piece of QoS description information that correspond to the first core network element.

In a possible design, the first core network element receives, from the second core network element, the information indicating whether the second core network element satisfies the parameter type information and the parameter requirement that are sent by the first core network element and that correspond to the second core network element, the information indicating whether the first core network element satisfies the parameter type information and the parameter requirement in the at least one piece of QoS description information that correspond to the first core network element, and the information indicating whether the application function network element satisfies the parameter type information and the parameter requirement in the at least one piece of QoS description information that correspond to the application function network element.

In a possible design, the first core network element receives, from the application function network element, the information indicating whether the application function network element satisfies the parameter type information and the parameter requirement that are sent by the first core network element and that correspond to the application function network element.

In a possible design, the first core network element receives, from the application function network element, the information indicating whether the application function network element satisfies the parameter type information and the parameter requirement that are sent by the first core network element and that correspond to the application function network element and the information indicating whether the first core network element satisfies the parameter type information and the parameter requirement in the at least one piece of QoS description information that correspond to the first core network element.

In a possible design, the first core network element receives, from the application function network element, the information indicating whether the application function network element satisfies the parameter type information and the parameter requirement that are sent by the first core network element and that correspond to the application function network element, the information indicating whether the first core network element satisfies the parameter type information and the parameter requirement in the at least one piece of QoS description information that correspond to the first core network element, and the information indicating whether the second core network element satisfies the parameter type information and the parameter requirement in the at least one piece of QoS description information that correspond to the second core network element.

In a possible design, the first core network element receives, from the second core network element, the feedback information of the parameter type information and the parameter requirement in the at least one piece of QoS description information that correspond to the second core network element and the feedback information of the parameter type information and the parameter requirement that correspond to the at least one of the third core network element, the access network element, and the terminal.

In a possible design, the first core network element receives, from the second core network element or the application function network element, the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

212. The first core network element determines at least one piece of target QoS description information in the at least one piece of QoS description information based on the feedback information.

In a possible design, the first core network element determines the at least one piece of target QoS description information based on the feedback information of the parameter type information and the parameter requirement in the at least one piece of QoS description information that correspond to at least one of the first core network element, the second core network element, the third core network element, the access network element, the terminal device, and the application function network element.

In a possible design, the feedback information of the parameter type information and the parameter requirement that correspond to the at least one of the first core network element, the second core network element, the third core network element, the access network element, the terminal device, and the application function network element includes: the information indicating whether the first core network element satisfies the parameter type information and the parameter requirement in the at least one piece of QoS description information that correspond to the first core network element, the information indicating whether the second core network element satisfies the parameter type information and the parameter requirement in the at least one piece of QoS description information that correspond to the second core network element, the information indicating whether the third core network element satisfies the parameter type information and the parameter requirement in the at least one piece of QoS description information that correspond to the third core network element, the information indicating whether the access network element satisfies the parameter type information and the parameter requirement in the at least one piece of QoS description information that correspond to the access network element, the information indicating whether the terminal device satisfies the parameter type information and the parameter requirement in the at least one piece of QoS description information that correspond to the terminal device, and the information indicating whether the application function network element satisfies the parameter type information and the parameter requirement in the at least one piece of QoS description information that correspond to the application function network element.

In a possible implementation, if the first core network element determines that all parameter requirements in any piece of the at least one piece of QoS description information may be satisfied by a corresponding network element, the first core network element may determine the QoS description information as the target QoS description information. If there are a plurality of pieces of such QoS description information, the first core network element may randomly select one piece of QoS description information from the plurality of pieces of QoS description information as the target QoS description information.

For example, assuming that the first core network element is a PCF, third QoS opinion information is shown in Table 4:

TABLE 4

| | | PCF | | SMF | | AMF | | AN | | UE | |
|---|---|---|---|---|---|---|---|---|---|---|---|
| Number | Time information | Service coding type | Service coding rate (Kbps) | DNN | NSSAI | TAC | Paging area | Data packet loss rate | Latency | UE priority | UE type |
| 1 | 1 | 1 | 0 | 0 | 0 | 0 | 0 | 1 | 1 | 0 | 0 |
| 2 | 1 | 1 | 0 | 0 | 0 | 0 | 0 | 0 | 0 | 0 | 0 |
| 3 | 1 | 1 | 1 | 1 | 1 | 1 | 1 | 1 | 1 | 1 | 1 |
| 4 | 1 | 1 | 0 | 0 | 0 | 0 | 0 | 0 | 0 | 1 | 1 |
| 5 | 1 | 1 | 0 | 0 | 1 | 1 | 1 | 1 | 1 | 0 | 0 |
| 6 | 1 | 1 | 0 | 0 | 0 | 0 | 0 | 0 | 0 | 0 | 0 |
| 7 | 1 | 1 | 0 | 0 | 0 | 0 | 1 | 1 | 1 | 1 | 1 |
| 8 | 1 | 1 | 0 | 0 | 0 | 0 | 0 | 0 | 0 | 0 | 0 |
| 9 | 0 | 0 | 0 | 0 | 0 | 0 | 1 | 1 | 0 | 0 | 0 |
| 10 | 0 | 0 | 0 | 0 | 0 | 0 | 0 | 0 | 1 | 1 | 1 |

Because all parameter requirements of QoS description information whose number is 2 may be satisfied by a corresponding network element, the PCF may determine the QoS description information whose number is 2 as the target QoS description information.

In a possible implementation, if there are a plurality of pieces of QoS description information satisfied by the first core network element, the first core network element may determine, as the target QoS description information, one piece of QoS description information with a smallest/largest number in one or more pieces of corresponding QoS description information satisfied by all network elements; or the first core network element may select, as the target QoS description information, one piece of QoS description information corresponding to a smallest quantity of consumed air interface resources from QoS description information sets satisfied by all network elements; or the first core network element may randomly select, as the target QoS description information, one piece of QoS description information from QoS description information sets satisfied by all network elements. The first core network element may alternatively determine the target QoS description information in another manner. This is not limited herein. The first core network element may send the target QoS description information to another core network element, access network element, or terminal, so that the another core network element, access network element, or terminal executes a quality of service policy such as resource allocation, scheduling, or threshold control based on the target QoS description information.

In a possible implementation, the first core network element sends the target QoS description information or index information corresponding to the target QoS description information to the second core network element, the access network element, or the terminal, so that the second core network element or the access network element allocates a corresponding resource based on the target QoS description information, or the terminal performs corresponding adjustment based on the target QoS description information.

In a possible implementation, if the target QoS description information satisfies a requirement of none of network elements, the first core network element may re-determine one piece of target QoS description information from the at least one piece of QoS description information.

Therefore, in the prior art, different control and management are performed on different types of services by using a subjective assumption or fixed QoS information, but the subjective assumption or the fixed QoS information may be inaccurate or not applicable to a network element. However, in this embodiment of this application, the first core network element may determine one piece of target QoS description information of the service in the received at least one piece of QoS description information based on the feedback information of the foregoing corresponding network element, and allocate a radio resource to the service and/or execute a quality of service policy based on the target QoS description information, so that quality of service of the service can be ensured.

Figures 1, 3:
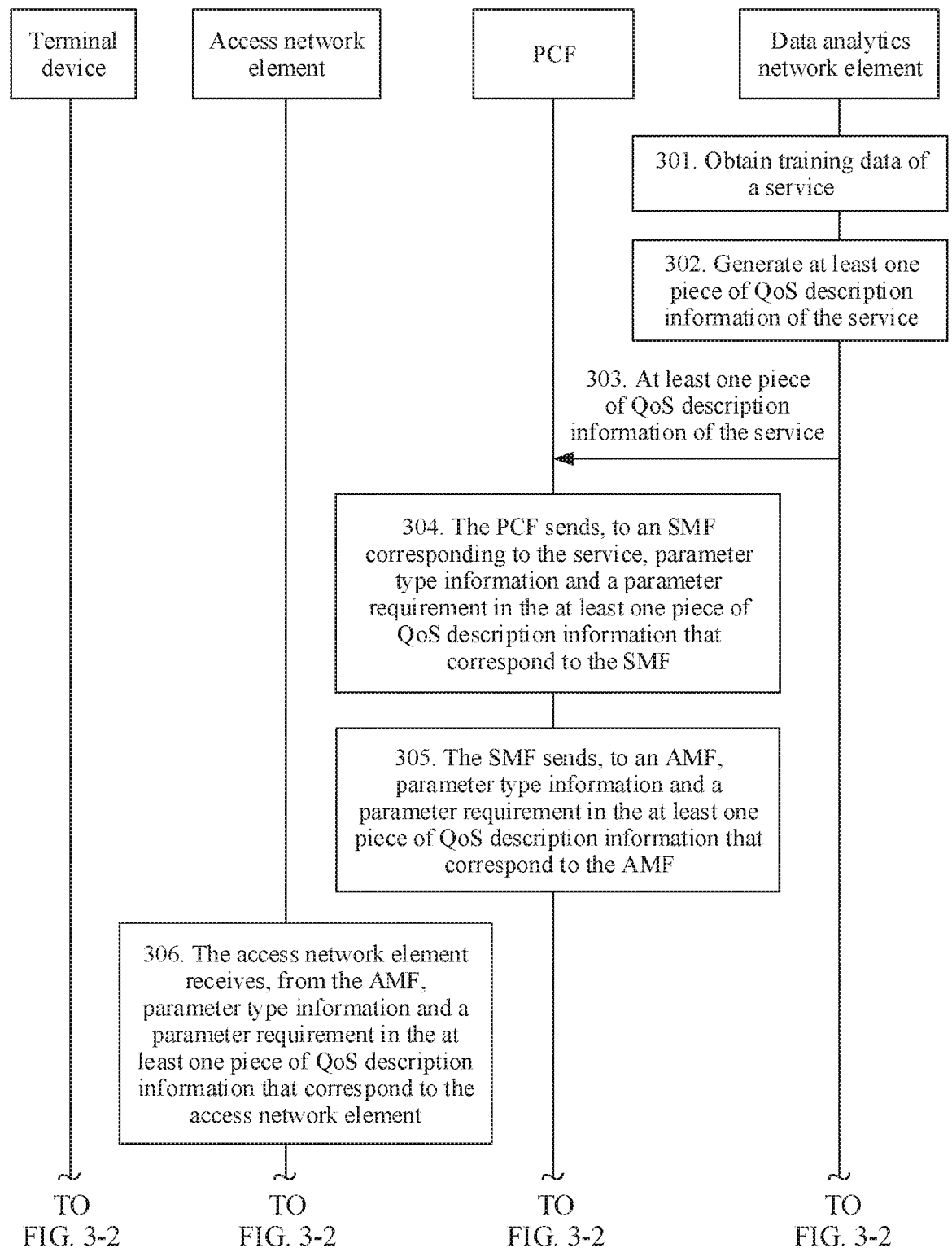
Figures 2, 3:
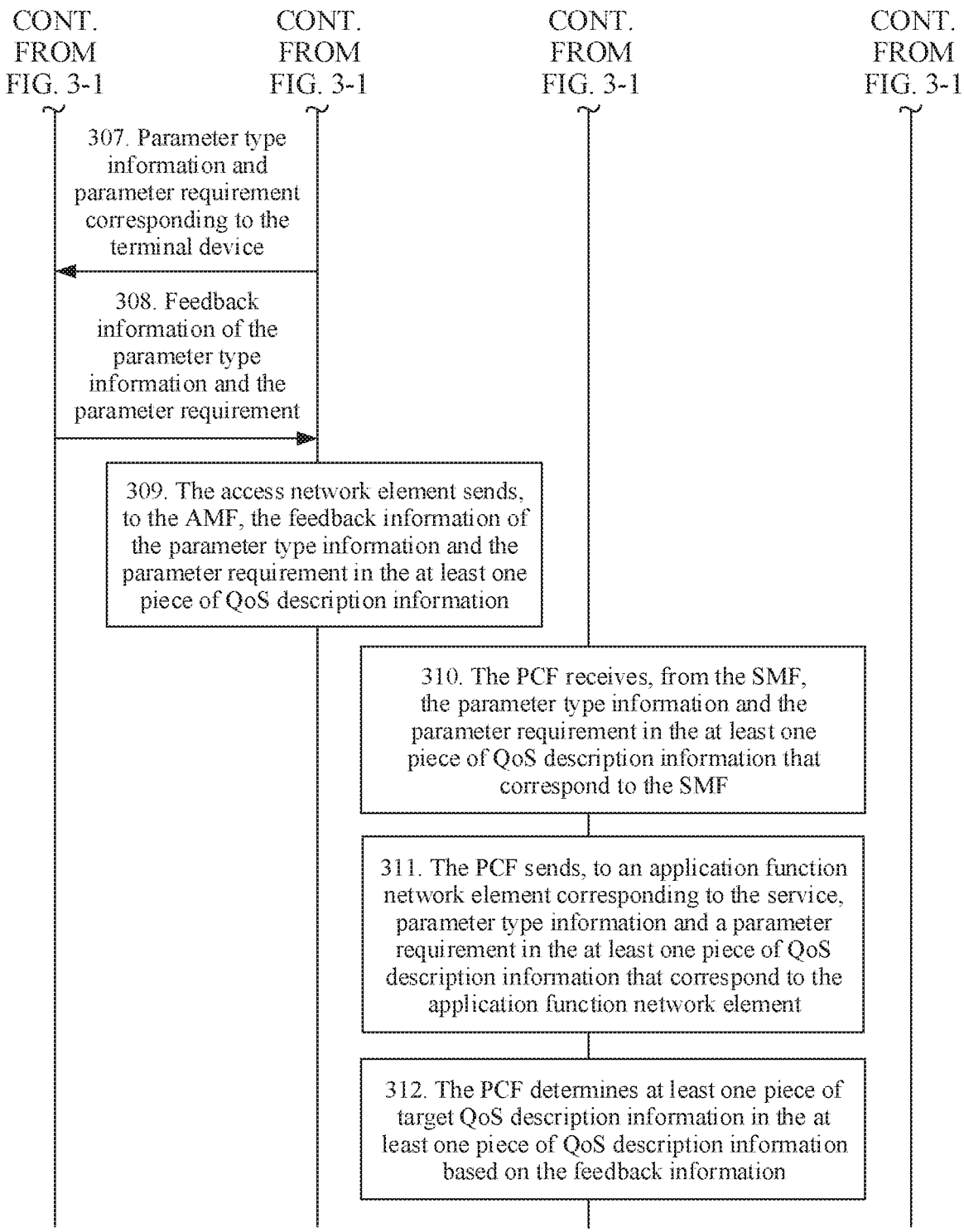

An embodiment of this application provides a method for determining QoS description information. As shown in FIG. 3-1 and FIG. 3-2, the method includes steps 301 to 312. The method for determining QoS description information includes a method for transmitting QoS description information.

301. A data analytics network element obtains training data of a service.

For a specific process, refer to the description of step 201.

302. The data analytics network element generates at least one piece of QoS description information of the service.

For a specific process, refer to the description of step 202.

303. The data analytics network element sends the at least one piece of QoS description information of the service to a first core network element.

For a specific process, refer to the description of step 203.

An example in which the first core network element is a PCF and the second core network element is an SMF is used for description below.

304. The PCF sends, to the SMF corresponding to the service, parameter type information and a parameter requirement in the at least one piece of QoS description information that correspond to the SMF.

In a possible design, the PCF receives initial QoS opinion information from the data analytics network element, and marks the initial QoS opinion information based on information indicating whether the PCF satisfies parameter type information and a parameter requirement in the at least one piece of QoS description information that correspond to the PCF. For example, if the PCF satisfies the parameter type information and the parameter requirement in the at least one piece of QoS description information that correspond to the PCF, the initial QoS opinion information may be marked as 1; or if the PCF does not satisfy the parameter type information and the parameter requirement in the at least one piece of QoS description information that correspond to the PCF, the initial QoS opinion information may be marked as 0.

An example in which a third core network element is an AMF is used for description below.

305. The SMF sends, to the AMF, parameter type information and a parameter requirement in the at least one piece of QoS description information that correspond to the AMF.

The SMF receives, from the PCF, the parameter type information and the parameter requirement in the at least one piece of QoS description information that correspond to the SMF.

In a possible design, the SMF receives, from the PCF, the QoS opinion information marked by the PCF, and marks the QoS opinion information based on information indicating whether the SMF satisfies the parameter type information and the parameter requirement in the at least one piece of QoS description information that correspond to the SMF. For example, if the SMF satisfies the parameter type information and the parameter requirement in the at least one piece of QoS description information that correspond to the SMF, the QoS opinion information may be marked as 1; or if the SMF does not satisfy the parameter type information and the parameter requirement in the at least one piece of QoS description information that correspond to the SMF, the QoS opinion information may be marked as 0.

In a possible design, the SMF receives, from the PCF, the parameter type information and the parameter requirement in the at least one piece of QoS description information that correspond to the AMF.

An example in which the second core network element is the AMF is used for description below. The AMF sends, to an access network element, parameter type information and a parameter requirement in the at least one piece of QoS description information that correspond to the access network element.

306. The access network element receives, from the AMF, the parameter type information and the parameter requirement in the at least one piece of QoS description information that correspond to the access network element.

The AMF receives, from the SMF, the parameter type information and the parameter requirement in the at least one piece of QoS description information that correspond to the AMF.

In a possible design, the AMF receives, from the SMF, the QoS opinion information marked by the SMF, and marks the QoS opinion information based on information indicating whether the AMF satisfies the parameter type information and the parameter requirement in the at least one piece of QoS description information that correspond to the AMF. For example, if the AMF satisfies the parameter type information and the parameter requirement in the at least one piece of QoS description information that correspond to the AMF, the QoS opinion information may be marked as 1; or if the AMF does not satisfy the parameter type information and the parameter requirement in the at least one piece of QoS description information that correspond to the AMF, the QoS opinion information may be marked as 0.

In a possible design, the AMF receives, from the SMF, the parameter type information and the parameter requirement in the at least one piece of QoS description information that correspond to the access network element. The parameter type information and the parameter requirement in the at least one piece of QoS description information that are sent by the SMF and that correspond to the access network element may be received from the PCF.

307. The access network element sends, to a terminal device corresponding to the service, parameter type information and a parameter requirement in the at least one piece of QoS description information that correspond to the terminal device.

The access network element receives, from the AMF, the parameter type information and the parameter requirement in the at least one piece of QoS description information that correspond to the access network element.

In a possible design, the access network element receives, from the AMF, the QoS opinion information marked by the AMF, and marks the QoS opinion information based on information indicating whether the access network element satisfies the parameter type information and the parameter requirement in the at least one piece of QoS description information that correspond to the access network element. For example, if the access network element satisfies the parameter type information and the parameter requirement in the at least one piece of QoS description information that correspond to the access network element, the QoS opinion information may be marked as 1; or if the access network element does not satisfy the parameter type information and the parameter requirement in the at least one piece of QoS description information that correspond to the access network element, the QoS opinion information may be marked as 0.

In a possible design, the access network element receives, from the AMF, the parameter type information and the parameter requirement in the at least one piece of QoS description information that correspond to the terminal device. The parameter type information and the parameter requirement in the at least one piece of QoS description information that are sent by the AMF and that correspond to the terminal device may be received by the AMF from the SMF. The parameter type information and the parameter requirement in the at least one piece of QoS description information that are sent by the SMF and that correspond to the terminal device may be received from the PCF.

308. The terminal device sends, to the access network element, feedback information of the parameter type information and the parameter requirement in the at least one piece of QoS description information.

In a possible design, the terminal device receives, from the access network element, the QoS opinion information marked by the access network element, and marks the QoS opinion information based on information indicating whether the terminal device satisfies the parameter type information and the parameter requirement in the at least one piece of QoS description information that correspond to the terminal device. For example, if the terminal device satisfies the parameter type information and the parameter requirement in the at least one piece of QoS description information that correspond to the terminal device, the QoS opinion information may be marked as 1; or if the terminal device does not satisfy the parameter type information and the parameter requirement in the at least one piece of QoS description information that correspond to the terminal device, the QoS opinion information may be marked as 0. The feedback information, sent by the terminal device to the access network element, of the parameter type information and the parameter requirement in the at least one piece of QoS description information may include the foregoing QoS opinion information marked by the terminal device.

309. The access network element sends, to the AMF, the feedback information of the parameter type information and the parameter requirement in the at least one piece of QoS description information.

In a possible design, the feedback information, sent by the access network element, of the parameter type information and the parameter requirement in the at least one piece of QoS description information may include QoS opinion information that has been marked by all of the PCF, the SMF, the AMF, the UPF, the access network element, and the terminal device.

An example in which the first core network element is the PCF and the second core network element is the SMF is used for description. The SMF may send, to the PCF, feedback information of the parameter type information and the parameter requirement in the at least one piece of QoS description information that correspond to the SMF.

310. The PCF receives, from the SMF, the feedback information of the parameter type information and the parameter requirement in the at least one piece of QoS description information that correspond to the SMF.

In a possible design, the feedback information, sent by the SMF, of the parameter type information and the parameter requirement in the at least one piece of QoS description information may include QoS opinion information that has been marked by all of the PCF, the SMF the AMF, the UPF, the access network element, and the terminal device.

311. The PCF sends, to an application function network element corresponding to the service, parameter type information and a parameter requirement in the at least one piece of QoS description information that correspond to the application function network element.

In a possible design, feedback information of the parameter type information and the parameter requirement in the at least one piece of QoS description information that are received by the application function network element may include QoS opinion information that has been marked by all of the PCF, the SMF, the AMF, the UPF, the access network element, and the terminal device. The application function network element may mark the QoS opinion information based on information indicating whether the application function network element satisfies the parameter type information and the parameter requirement in the at least one piece of QoS description information that correspond to the application function network element. For example, if the application function network element satisfies the parameter type information and the parameter requirement in the at least one piece of QoS description information that correspond to the application function network element, the QoS opinion information may be marked as 1; or if the application function network element does not satisfy the parameter type information and the parameter requirement in the at least one piece of QoS description information that correspond to the application function network element, the QoS opinion information may be marked as 0.

312. The PCF determines at least one piece of target QoS description information in the at least one piece of QoS description information based on the feedback information.

In a possible design, the PCF determines the at least one piece of target QoS description information based on the information that indicates whether the PCF satisfies the parameter type information and the parameter requirement in the at least one piece of QoS description information that correspond to the PCF, and the feedback information of the parameter type information and the parameter requirements that correspond to the SMF, the AMF, the access network element, the terminal device, and the application function network element. In other words, the PCF determines the at least one piece of target QoS description information in the at least one piece of QoS description information based on the QoS opinion information that has been marked by all of the PCF, the SMF, the AMF, the UPF, the access network element, the terminal device, and the application function network element.

Therefore, in the prior art, different control and management are performed on different types of services by using a subjective assumption or fixed QoS information, but the subjective assumption or the fixed QoS information may be inaccurate or not applicable to a network element. However, in this embodiment of this application, the PCF may determine one piece of target QoS description information of the service in the received at least one piece of QoS description information based on the feedback information of the foregoing corresponding network element, and allocate a radio resource to the service and/or execute a quality of service policy based on the target QoS description information, so that quality of service of the service can be ensured.

Figures 1, 4:
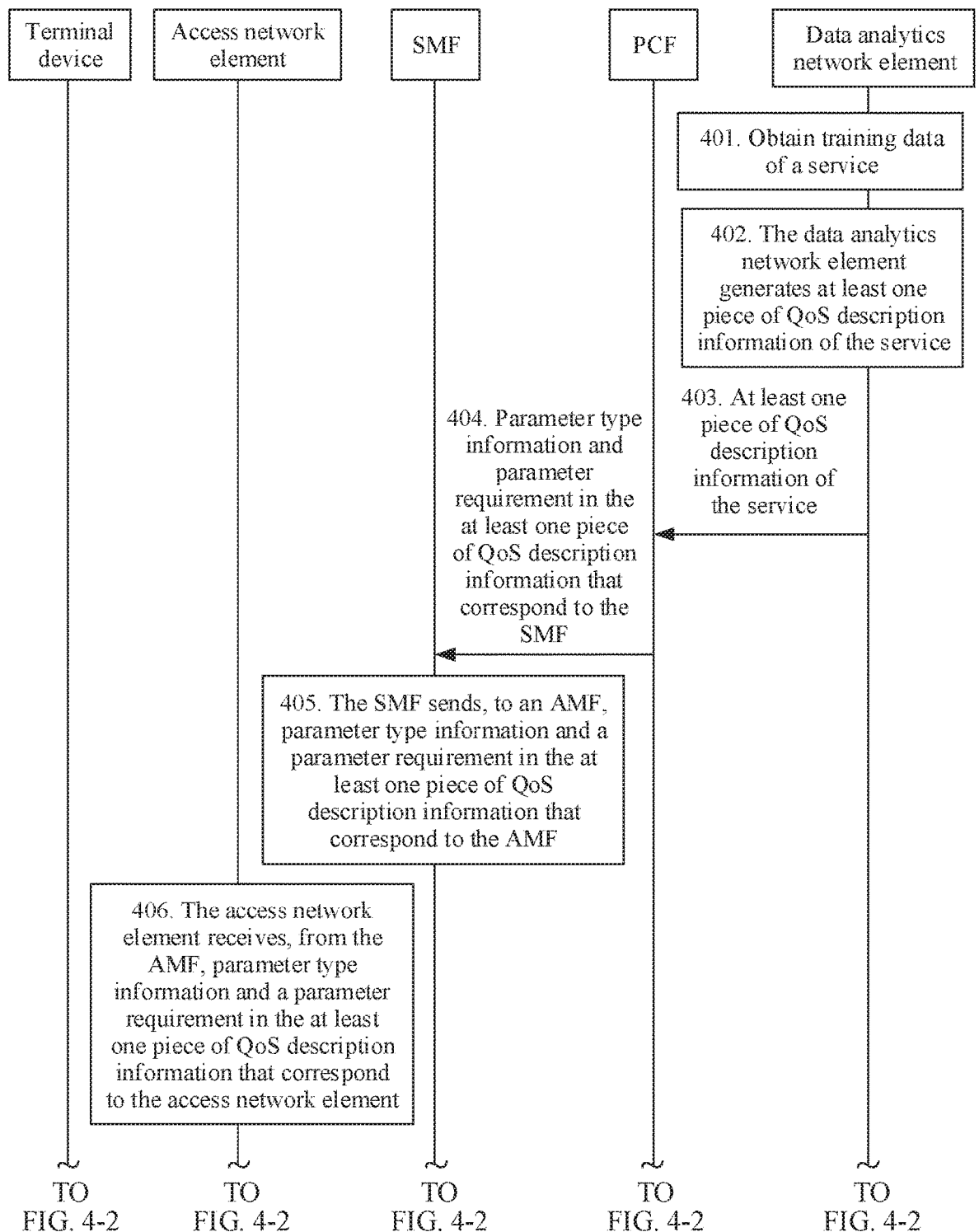
Figures 2, 4:
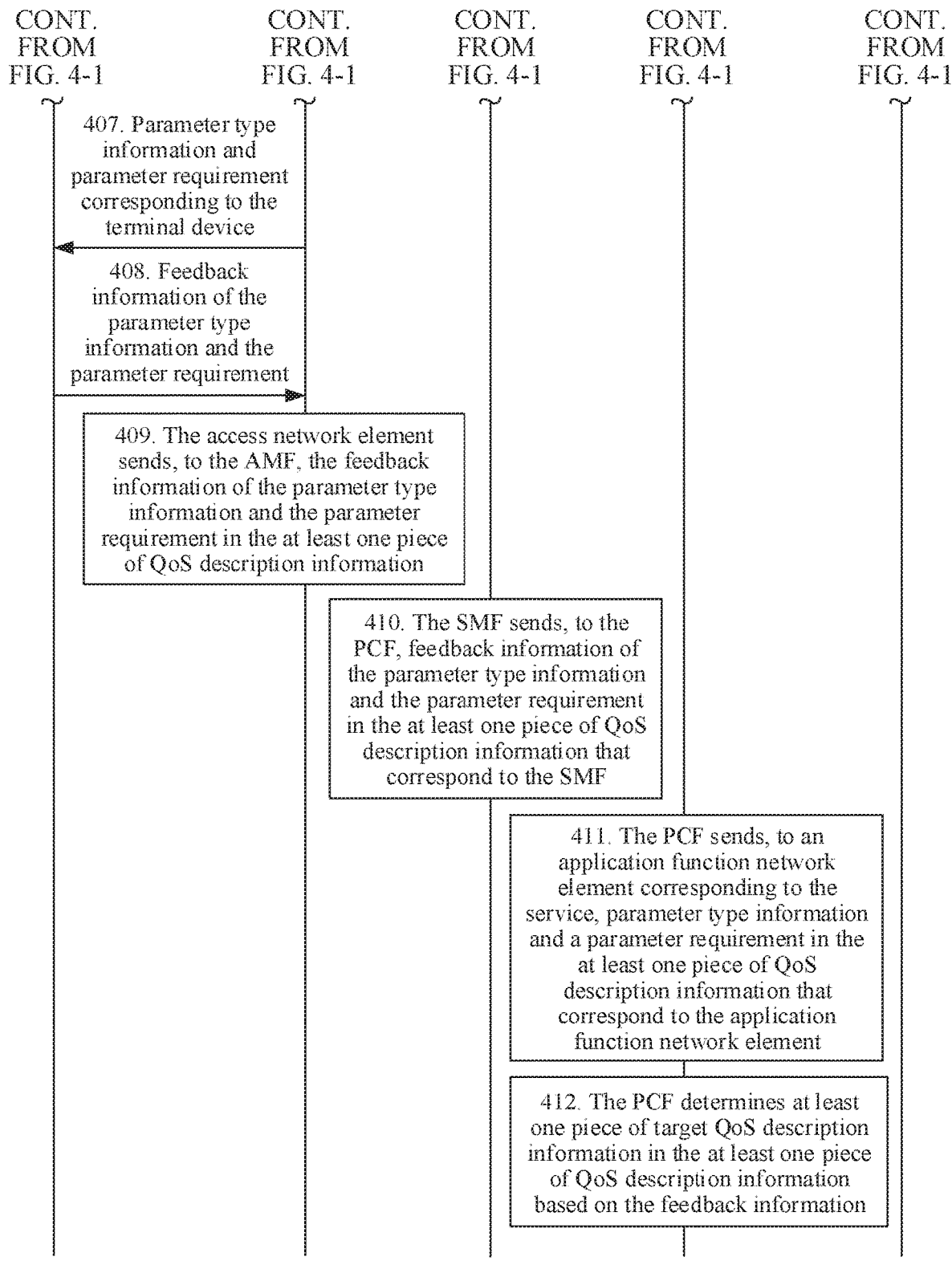

An embodiment of this application provides a method for determining QoS description information. As shown in FIG. 4-1 and FIG. 4-2, the method includes steps 401 to 412. The method for determining QoS description information includes a method for transmitting QoS description information.

401. A data analytics network element obtains training data of a service.

For a specific process, refer to step 201.

402. The data analytics network element generates at least one piece of QoS description information of the service.

For a specific process, refer to step 202.

403. The data analytics network element sends the at least one piece of QoS description information of the service to a first core network element.

For a specific process, refer to step 203.

An example in which the first core network element is a PCF and a second core network element is an SMF is used for description below.

404. The PCF sends, to the SMF corresponding to the service, parameter type information and a parameter requirement in the at least one piece of QoS description information that correspond to the SMF.

In a possible design, the PCF may further send, to the SMF, opinion information of the parameter type information and the parameter requirement in the at least one piece of QoS description information that correspond to the SMF, so that the SMF marks the opinion information based on parameter information obtained by the SMF and the parameter type information and the parameter requirement that correspond to the SMF.

An example in which a third core network element is an AMF is used for description below.

405. The SMF sends, to the AMF, parameter type information and a parameter requirement in the at least one piece of QoS description information that correspond to the AMF.

In a possible design, the SMF may further send, to the AMF, opinion information of the parameter type information and the parameter requirement in the at least one piece of QoS description information that correspond to the AMF, so that the AMF marks the opinion information based on parameter information obtained by the AMF and the parameter type information and the parameter requirement that correspond to the AMF.

An example in which the second core network element is the AMF is used for description below. The AMF sends, to an access network element, parameter type information and a parameter requirement in the at least one piece of QoS description information that correspond to the access network element.

406. The access network element receives, from the AMF, the parameter type information and the parameter requirement in the at least one piece of QoS description information that correspond to the access network element.

In a possible design, the AMF may further send, to the access network element, opinion information of the parameter type information and the parameter requirement in the at least one piece of QoS description information that correspond to the access network element, so that the access network element marks the opinion information based on parameter information obtained by the access network element and the parameter type information and the parameter requirement that correspond to the access network element.

407. The access network element sends, to a terminal device corresponding to the service, parameter type information and a parameter requirement in the at least one piece of QoS description information that correspond to the terminal device.

In a possible design, the access network element may further send, to the terminal device, opinion information of the parameter type information and the parameter requirement in the at least one piece of QoS description information that correspond to the terminal device, so that the terminal device marks the opinion information based on parameter information obtained by the terminal device and the parameter type information and the parameter requirement that correspond to the terminal device.

408. The terminal device sends, to the access network element, feedback information of the parameter type information and the parameter requirement in the at least one piece of QoS description information.

The terminal device may send the opinion information marked by the terminal device to the access network element.

409. The access network element sends, to the AMF, the feedback information of the parameter type information and the parameter requirement in the at least one piece of QoS description information.

The access network element receives, from the terminal device, the opinion information marked by the terminal device.

The access network element sends, to the AMF, the opinion information marked by the access network element. The access network element may further send, to the AMF, the opinion information marked by the terminal device.

410. When the first core network element is the SMF and the second core network element is the AMF, the AMF sends, to the SMF, feedback information of the parameter type information and the parameter requirement in the at least one piece of QoS description information that correspond to the AMF. When the first core network element is the PCF and the second core network element is the SMF, the SMF sends, to the PCF, feedback information of the parameter type information and the parameter requirement in the at least one piece of QoS description information that correspond to the SMF.

The AMF may further send, to the SMF the opinion information marked by the access network element and the opinion information marked by the terminal device.

The SMF may further send, to the PCF, the opinion information marked by the AMF, the opinion information marked by the access network element, and the opinion information marked by the terminal device.

411. The PCF sends, to an application function network element corresponding to the service, parameter type information and a parameter requirement in the at least one piece of QoS description information that correspond to the application function network element.

412. The PCF determines at least one piece of target QoS description information in the at least one piece of QoS description information based on the feedback information.

The PCF receives, from the application function network element, feedback information of the parameter type information and the parameter requirement in the at least one piece of QoS description information that correspond to the application function network element.

That is, the PCF determines the at least one piece of target QoS description information in the at least one piece of QoS description information based on the feedback information.

In a possible design, the PCF determines the at least one piece of target QoS description information based on the information that is in the at least one piece of QoS description information and that indicates whether the PCF satisfies the parameter type information and the parameter requirement in the at least one piece of QoS description information that correspond to the PCF, and the feedback information of the parameter type information and the parameter requirement that correspond to at least one of the SMF, the AMF, the access network element, the terminal device, and the application function network element. The feedback information of the parameter type information and the parameter requirement that correspond to the at least one of the SMF, the AMF, the access network element, the terminal device, and the application function network element may include QoS opinion information marked by at least one of the SMF, the AMF, the access network element, the terminal device, and the application function network element.

Therefore, in the prior art, different control and management are performed on different types of services by using a subjective assumption or fixed QoS information, but the subjective assumption or the fixed QoS information may be inaccurate or not applicable to a network element. However, in this embodiment of this application, the PCF may determine one piece of target QoS description information of the service in the received at least one piece of QoS description information based on the feedback information of the foregoing corresponding network element, and allocate a radio resource to the service and/or execute a quality of service policy based on the target QoS description information, so that quality of service of the service can be ensured.

Figures 1, 5:
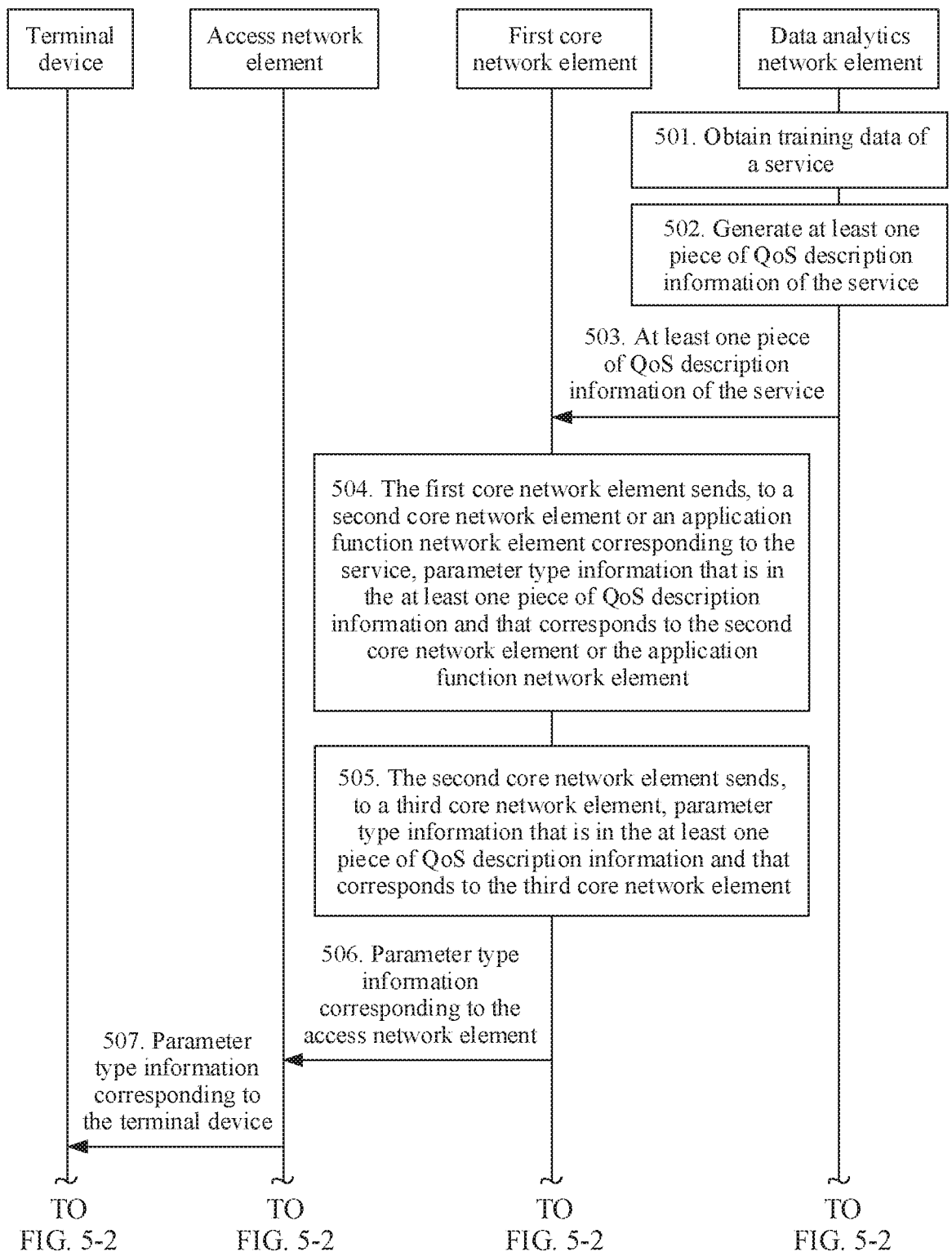
Figures 2, 5:
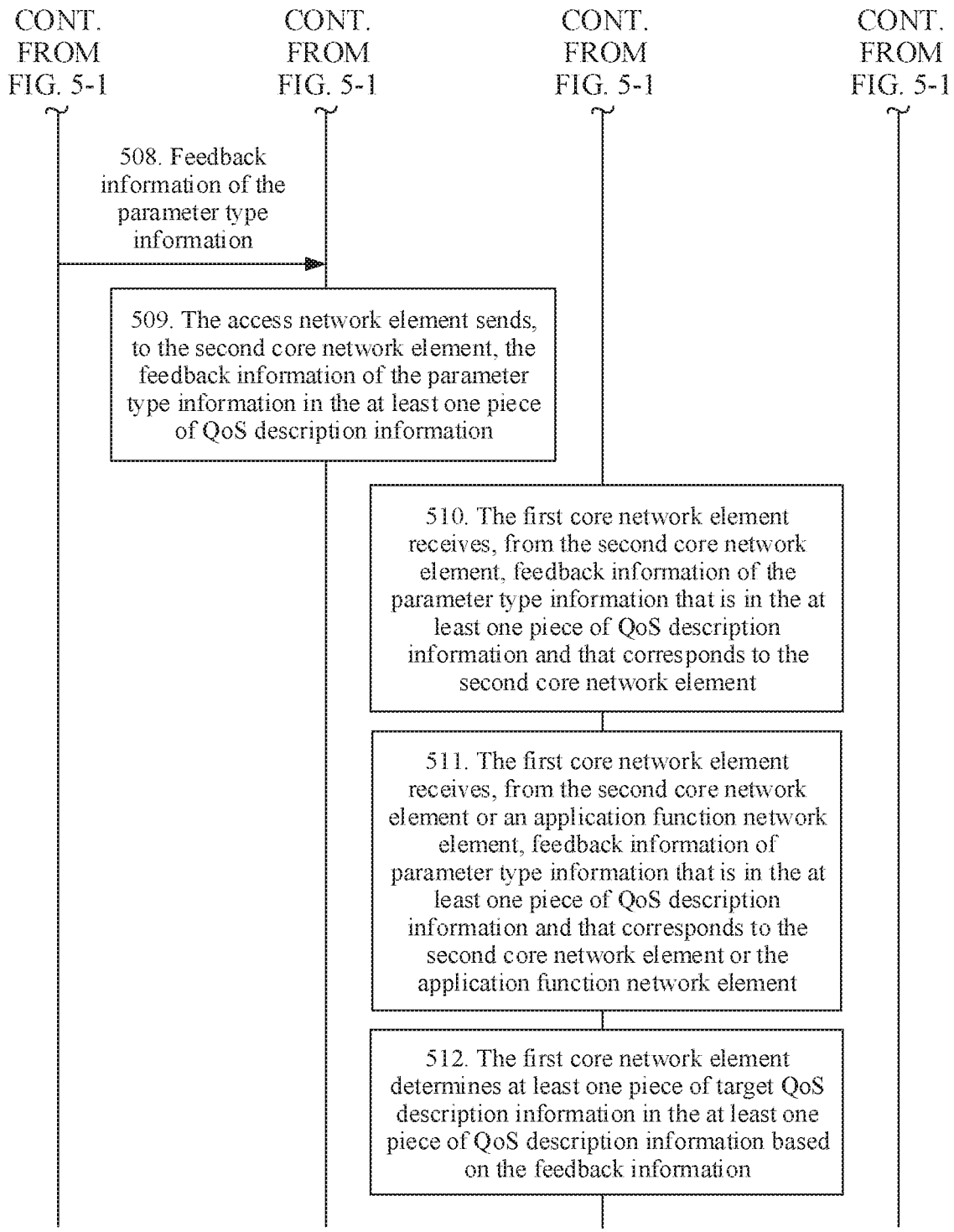

An embodiment of this application provides a method for determining QoS description information. As shown in FIG. 5-1 and FIG. 5-2, the method includes steps 501 to 512. The method for determining QoS description information includes a method for transmitting QoS description information.

501. A data analytics network element obtains training data of a service.

For a specific process, refer to step 201.

502. The data analytics network element generates at least one piece of QoS description information of the service.

For a specific process, refer to step 202.

503. The data analytics network element sends the at least one piece of QoS description information of the service to a first core network element.

For a specific process, refer to step 203.

An example in which the first core network element is a PCF and a second core network element is an SMF is used for description below.

504. The first core network element sends, to the second core network element corresponding to the service, parameter type information that is in the at least one piece of QoS description information and that corresponds to the second core network element or an application function network element.

That is, the PCF sends, to the SMF corresponding to the service, parameter type information that is in the at least one piece of QoS description information and that corresponds to the SMF.

An example in which a third core network element is an AMF is used for description below.

505. The second core network element sends, to the third core network element corresponding to the service, parameter type information that is in the at least one piece of QoS description information and that corresponds to the third core network element.

The SMF sends, to the AMF, parameter type information that is in the at least one piece of QoS description information and that corresponds to the AMF.

An example in which the second core network element is the AMF is used for description below.

506. The second core network element sends, to an access network element, parameter type information that is in the at least one piece of QoS description information and that corresponds to the access network element.

That is, the AMF sends, to the access network element, the parameter type information that is in the at least one piece of QoS description information and that corresponds to the access network element.

507. The access network element sends, to a terminal device corresponding to the service, parameter type information that is in the at least one piece of QoS description information and that corresponds to the terminal device.

508. The terminal device sends, to the access network element, feedback information of the parameter type information in the at least one piece of QoS description information.

509. The access network element sends, to the second core network element, the feedback information of the parameter type information in the at least one piece of QoS description information.

That is, the access network element sends, to the AMF, the feedback information of the parameter type information in the at least one piece of QoS description information.

An example in which the first core network element is the PCF and the second core network element is the SMF is used for description below.

510. The second core network element sends, to the first core network element, feedback information of parameter type information that is in the at least one piece of QoS description information and that corresponds to the second core network element.

That is, the SMF sends, to the PCF, feedback information of the parameter type information that is in the at least one piece of QoS description information and that corresponds to the SMF.

511. The first core network element sends, to an application function network element corresponding to the service, parameter type information that is in the at least one piece of QoS description information and that corresponds to the application function network element.

That is, the PCF sends, to the application function network element corresponding to the service, the parameter type information that is in the at least one piece of QoS description information and that corresponds to the application function network element.

512. The first core network element determines at least one piece of target QoS description information in the at least one piece of QoS description information based on the feedback information.

That is, the PCF determines the at least one piece of target QoS description information in the at least one piece of QoS description information based on the feedback information.

In a possible design, the PCF determines the at least one piece of target QoS description information based on the information that is in the at least one piece of QoS description information and that indicates whether the PCF satisfies the parameter type information that is in the at least one piece of QoS description information and that corresponds to the PCF, and the feedback information of the parameter type information corresponding to at least one of the SMF, the AMF, the access network element, the terminal device, and the application function network element.

Therefore, in the prior art, different control and management are performed on different types of services by using a subjective assumption or fixed QoS information, but the subjective assumption or the fixed QoS information may be inaccurate or not applicable to a network element. However, in this embodiment of this application, the PCF may determine one piece of target QoS description information of the service in the received at least one piece of QoS description information based on the feedback information of the foregoing corresponding network element, and allocate a radio resource to the service and/or execute a quality of service policy based on the target QoS description information, so that quality of service of the service can be ensured.

The foregoing mainly describes the solutions provided in the embodiments of this application from perspectives of the first core network element, the second core network element, the access network element, and the terminal device. It may be understood that, to implement the foregoing functions, the first core network element, the second core network element, the access network element, and the terminal device include corresponding hardware structures and/or software modules for performing the functions. A person skilled in the art should easily be aware that, in combination with the algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the first core network element, the second core network element, the access network element, and the terminal device may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used.

Figure 6:
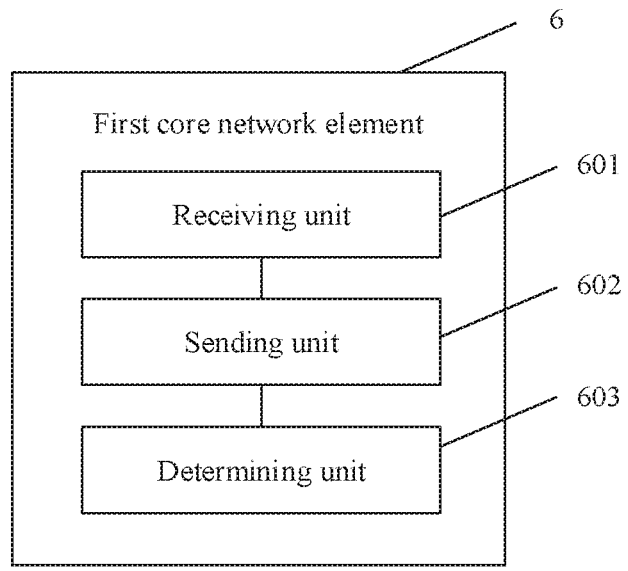
FIG. 6 is a schematic structural diagram of a first core network element according to an embodiment of this application.

When the functional modules are obtained through division based on corresponding functions. FIG. 6 is a possible schematic structural diagram of a first core network element 6 in the foregoing embodiments. The first core network element includes a receiving unit 601, a sending unit 602, and a determining unit 603. In this embodiment of this application, the receiving unit 601 may be configured to receive, from a data analytics network element, at least one piece of QoS description information of a service, where each piece of the at least one piece of QoS description information includes parameter type information and a parameter requirement. The sending unit 602 may be configured to send, to a second core network element or an application function network element corresponding to the service, parameter type information and a parameter requirement in the at least one piece of QoS description information that correspond to the second core network element or the application function network element. The receiving unit 601 is further configured to receive, from the second core network element or the application function network element, feedback information of the parameter type information and the parameter requirement in the at least one piece of QoS description information that correspond to the second core network element or the application function network element. The determining unit 603 is configured to determine at least one piece of target QoS description information in the at least one piece of QoS description information based on the feedback information. All related content of the steps in the method embodiments shown in FIG. 2-1 and FIG. 2-2, FIG. 3-1 and FIG. 3-2, FIG. 4-1 and FIG. 4-2, and FIG. 5-1 and FIG. 5-2 may be cited in function descriptions of corresponding functional modules, and details are not described herein again.

Figure 7:
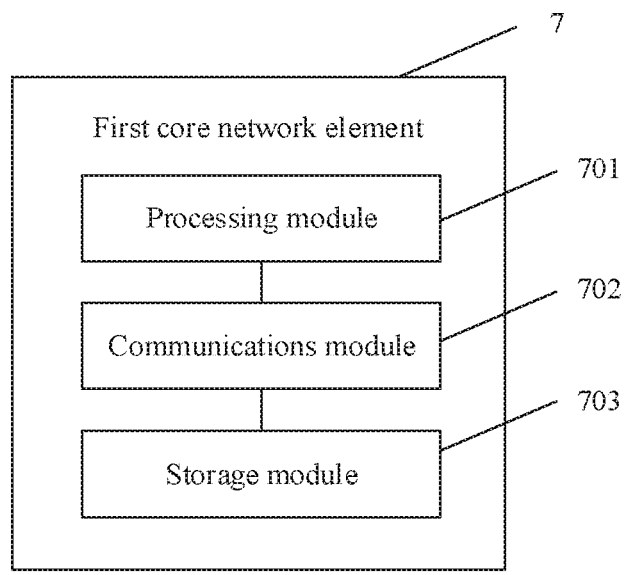
FIG. 7 is a schematic structural diagram of a first core network element according to an embodiment of this application.

When an integrated unit is used, FIG. 7 is a possible schematic structural diagram of a first core network element in the foregoing embodiments. In this application, the first core network element may include a processing module 701, a communications module 702, and a storage module 703. The processing module 701 is configured to control hardware apparatuses, application software, and the like of the first core network element. The communications module 702 is configured to accept, in a communication manner such as wireless fidelity (Wi-Fi), an instruction sent by another device, or send data of the first core network element to another device. The storage module 703 is configured to store a software program of the first core network element, store data, run software, and so on. The processing module 701 may be a determining unit or a controller, for example, may be a central determining unit (CPU), a general-purpose determining unit, a digital signal determining unit (DSP), an application-specific integrated circuit (ASIC), a field programmable gate array (FPGA) or another programmable logic device, a transistor logic device, a hardware component, or any combination thereof. The processing module 701 may implement or execute various example logical blocks, modules, and circuits described with reference to content disclosed in this application. The communications module 702 may be a transceiver, a transceiver circuit, a communications interface, or the like. The storage module 703 may be a memory.

Figure 8:
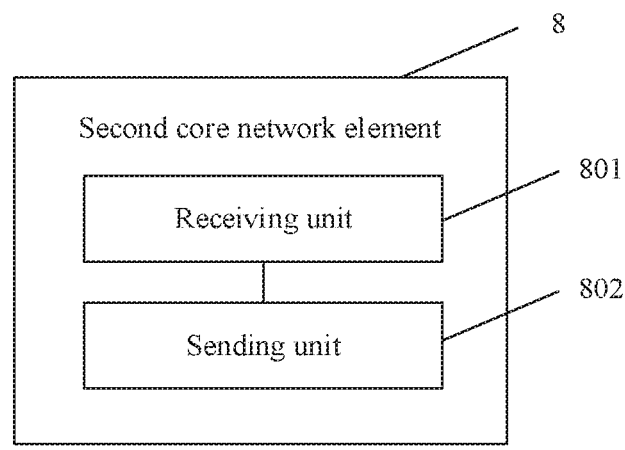
FIG. 8 is a schematic structural diagram of a second core network element according to an embodiment of this application.

When functional modules are obtained through division based on corresponding functions. FIG. 8 is a possible schematic structural diagram of a second core network element 8 in the foregoing embodiments. The second core network element includes a receiving unit 801 and a sending unit 802. In this embodiment of this application, the receiving unit 801 may be configured to receive, from a first core network element, parameter type information and a parameter requirement in at least one piece of QoS description information of a service that correspond to the second core network element. The sending unit 802 may be configured to send, to the first core network element, feedback information of the parameter type information and the parameter requirement in the at least one piece of QoS description information that correspond to the second core network element. All related content of the steps in the method embodiments shown in FIG. 2-1 and FIG. 2-2, FIG. 3-1 and FIG. 3-2, FIG. 4-1 and FIG. 4-2, and FIG. 5-1 and FIG. 5-2 may be cited in function descriptions of corresponding functional modules, and details are not described herein again.

Figure 9:
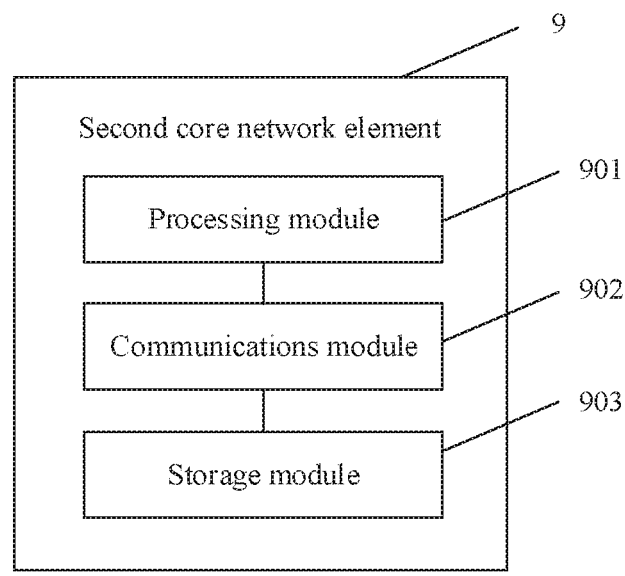
FIG. 9 is a schematic structural diagram of a second core network element according to an embodiment of this application.

When an integrated unit is used, FIG. 9 is a possible schematic structural diagram of a second core network element in the foregoing embodiments. In this application, the second core network element may include a processing module 901, a communications module 902, and a storage module 903. The processing module 901 is configured to control hardware apparatuses, application software, and the like of the second core network element. The communications module 902 is configured to accept, in a communication manner such as Wi-Fi, an instruction sent by another device, or send data of the second core network element to another device. The storage module 903 is configured to store a software program of the second core network element, store data, run software, and so on. The processing module 901 may be a determining unit or a controller, for example, may be a CPU, a general-purpose determining unit, a DSP, an ASIC, an FPGA or another programmable logic device, a transistor logic device, a hardware component, or any combination thereof. The processing module 901 may implement or execute various example logical blocks, modules, and circuits described with reference to content disclosed in this application. Alternatively, the determining unit may be a combination that implements a computing function, for example, a combination that includes one or more micro determining units or a combination of a DSP and a micro determining unit. The communications module 902 may be a transceiver, a transceiver circuit, a communications interface, or the like. The storage module 903 may be a memory.

Figure 10:
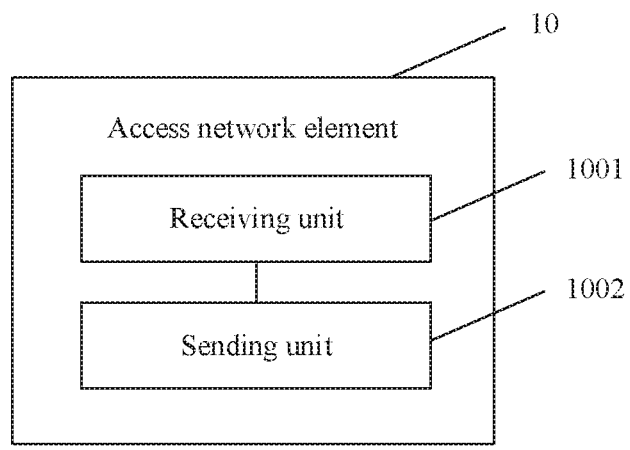
FIG. 10 is a schematic structural diagram of an access network element according to an embodiment of this application.

When the functional modules are obtained through division based on corresponding functions, FIG. 10 is a possible schematic structural diagram of an access network element 10 in the foregoing embodiments. The access network element includes a receiving unit 1001 and a sending unit 1002. In this embodiment of this application, the receiving unit 1001 may be configured to receive, from a second core network element, parameter type information and a parameter requirement in at least one piece of QoS description information of a service that correspond to the access network element. The sending unit 1002 may be configured to send, to the second core network element, feedback information of the parameter type information and the parameter requirement in the at least one piece of QoS description information. All related content of the steps in the method embodiments shown in FIG. 2-1 and FIG. 2-2, FIG. 3-1 and FIG. 3-2, FIG. 4-1 and FIG. 4-2, and FIG. 5-1 and FIG. 5-2 may be cited in function descriptions of corresponding functional modules, and details are not described herein again.

Figure 11:
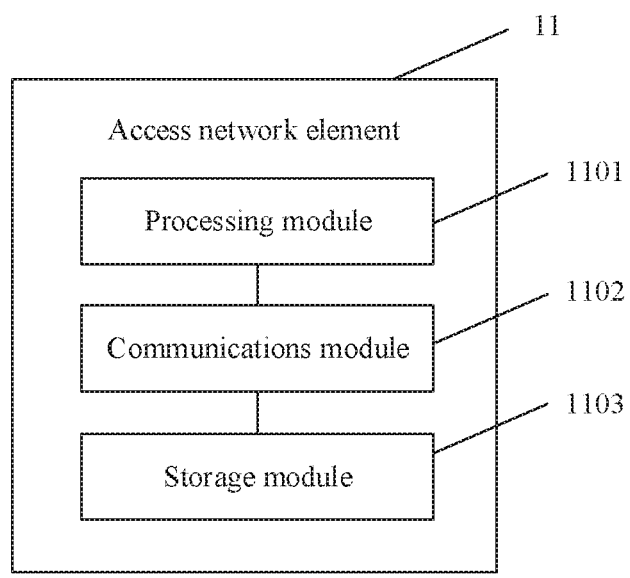
FIG. 11 is a schematic structural diagram of an access network element according to an embodiment of this application.

When an integrated unit is used, FIG. 11 is a possible schematic structural diagram of an access network element in the foregoing embodiments. In this application, the access network element may include a processing module 1101, a communications module 1102, and a storage module 1103. The processing module 1101 is configured to control hardware apparatuses, application software, and the like of the access network element. The communications module 1102 is configured to accept, in a communication manner such as Wi-Fi an instruction sent by another device, or send data of the access network element to another device. The storage module 1103 is configured to store a software program of the access network element, store data, run software, and so on. The processing module 1101 may be a determining unit or a controller, for example, may be a CPU, a general-purpose determining unit, a DSP, an ASIC, an FPGA or another programmable logic device, a transistor logic device, a hardware component, or any combination thereof. The processing module 1101 may implement or execute various example logical blocks, modules, and circuits described with reference to content disclosed in this application. Alternatively, the determining unit may be a combination that implements a computing function, for example, a combination that includes one or more micro determining units or a combination of a DSP and a micro determining unit. The communications module 1102 may be a transceiver, a transceiver circuit, a communications interface, or the like. The storage module 1103 may be a memory.

Figure 12:
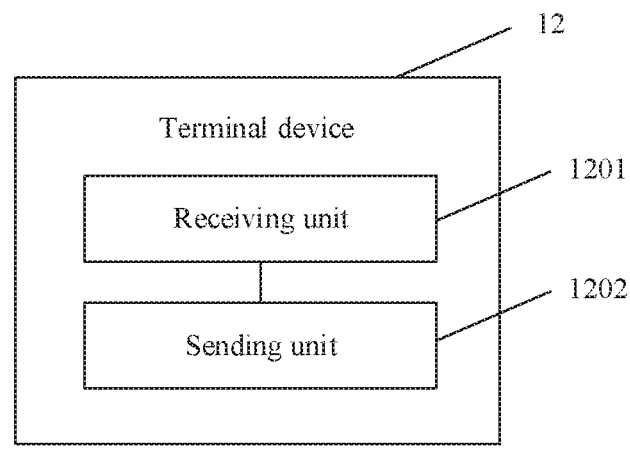
FIG. 12 is a schematic structural diagram of a terminal device according to an embodiment of this application.

When functional modules are obtained through division based on corresponding functions, FIG. 12 is a possible schematic structural diagram of a terminal device 12 in the foregoing embodiments. The terminal device includes a receiving unit 1201 and a sending unit 1202. In this embodiment of this application, the receiving unit 1201 may be configured to receive, from an access network element, parameter type information and a parameter requirement in at least one piece of QoS description information of a service that correspond to a terminal device. The sending unit 1202 may be configured to send, to the access network element, feedback information of the parameter type information and the parameter requirement in the at least one piece of QoS description information. All related content of the steps in the method embodiments shown in FIG. 2-1 and FIG. 2-2, FIG. 3-1 and FIG. 3-2, FIG. 4-1 and FIG. 4-2, and FIG. 5-1 and FIG. 5-2 may be cited in function descriptions of corresponding functional modules, and details are not described herein again.

Figure 13:
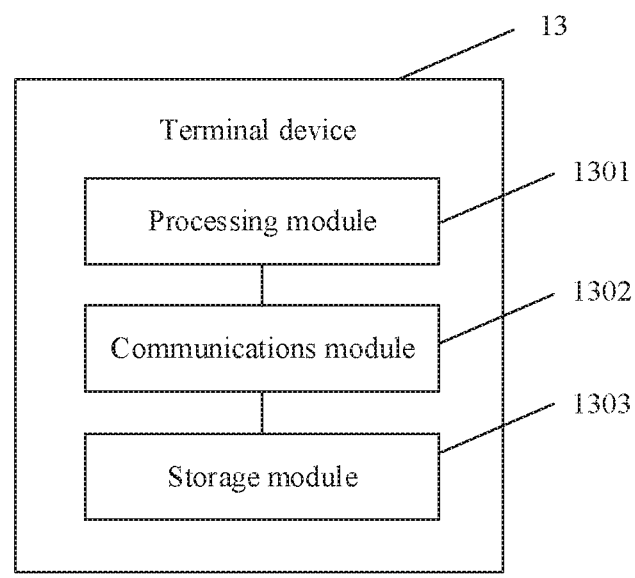
FIG. 13 is a schematic structural diagram of a terminal device according to an embodiment of this application.

When an integrated unit is used, FIG. 13 is a possible schematic structural diagram of a terminal device in the foregoing embodiments. In this application, the terminal device may include a processing module 1301, a communications module 1302, and a storage module 1303. The processing module 1301 is configured to control hardware apparatuses, application software, and the like of the terminal device. The communications module 1302 is configured to accept, in a communication manner such as Wi-Fi, an instruction sent by another device, or send data of the terminal device to another device. The storage module 1303 is configured to store a software program of the terminal device, store data, run software, and so on. The processing module 1301 may be a determining unit or a controller, for example, may be a CPU, a general-purpose determining unit, a DSP, an ASIC, an FPGA or another programmable logic device, a transistor logic device, a hardware component, or any combination thereof. The processing module 1301 may implement or execute various example logical blocks, modules, and circuits described with reference to content disclosed in this application. Alternatively, the determining unit may be a combination that implements a computing function, for example, a combination that includes one or more micro determining units or a combination of a DSP and a micro determining unit. The communications module 1302 may be a transceiver, a transceiver circuit, a communications interface, or the like. The storage module 1303 may be a memory.

A person skilled in the art should be aware that in the foregoing one or more examples, functions described in this application may be implemented by hardware, software, firmware, or any combination thereof. When implemented by software, these functions may be stored in a computer-readable medium or transmitted as one or more instructions or code in a computer-readable medium. The computer-readable medium includes a computer storage medium and a communications medium. The communications medium includes any medium that enables transmission of a computer program from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a determining unit of another programmable data processing device to generate a machine, so that the instructions executed by a computer or a determining unit of another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A method for determining quality of service (QoS) description information, the method comprising:
receiving, by a first core network element from a data analytics network element, at least one piece of QoS description information of a service, wherein each piece of the at least one piece of QoS description information comprises parameter type information and a parameter requirement;
sending, by the first core network element to a second core network element or an application function network element corresponding to the service, parameter type information and a parameter requirement in the at least one piece of QoS description information that correspond to the second core network element or the application function network element;
receiving, by the first core network element from the second core network element or the application function network element, feedback information of the parameter type information and the parameter requirement in the at least one piece of QoS description information that correspond to the second core network element or the application function network element; and
determining, by the first core network element, at least one piece of target QoS description information in the at least one piece of QoS description information based on the feedback information.

2. The method according to claim 1, wherein
each piece of the at least one piece of QoS description information further comprises network element information, and
the network element information indicates a network element corresponding to the parameter type information and the parameter requirement in the at least one piece of QoS description information.

3. The method according to claim 1, further comprising:
determining, by the first core network element, information indicating whether the first core network element satisfies parameter type information and a parameter requirement in the at least one piece of QoS description information that correspond to the first core network element.

4. The method according to claim 1, wherein the feedback information received from the second core network element indicates whether the second core network element satisfies the parameter type information and the parameter requirement that are sent by the first core network element and that correspond to the second core network element.

5. The method according to claim 3, further comprising:
sending, by the first core network element to the second core network element corresponding to the service, information indicating whether the first core network element satisfies the parameter type information and the parameter requirement in the at least one piece of QoS description information that correspond to the first core network element.

6. The method according to claim 3, further comprising:
sending, by the first core network element to the second core network element corresponding to the service, the information indicating whether the first core network element satisfies the parameter type information and the parameter requirement in the at least one piece of QoS description information that correspond to the first core network element, and information indicating whether the application function network element satisfies the parameter type information and the parameter requirement in the at least one piece of QoS description information that correspond to the application function network element.

7. The method according to claim 1, wherein the receiving, the feedback information received from the application function network element indicates whether the application function network element satisfies the parameter type information and the parameter requirement that are sent by the first core network element and that correspond to the application function network element.

8. The method according to claim 3, further comprising:
sending, by the first core network element to the application function network element corresponding to the service, the parameter type information and the parameter requirement in the at least one piece of QoS description information that correspond to the application function network element and the information indicating whether the first core network element satisfies the parameter type information and the parameter requirement in the at least one piece of QoS description information that correspond to the first core network element.

9. The method according to claim 3, further comprising:
sending, by the first core network element to the application function network element corresponding to the service, the parameter type information and the parameter requirement in the at least one piece of QoS description information that correspond to the application function network element, the information indicating whether the first core network element satisfies the parameter type information and the parameter requirement in the at least one piece of QoS description information that correspond to the first core network element, and information indicating whether the second core network element satisfies the parameter type information and the parameter requirement in the at least one piece of QoS description information that correspond to the second core network element.

10. The method according to claim 1, further comprising:
sending, by the first core network element to the second core network element corresponding to the service, the parameter type information and the parameter requirement in the at least one piece of QoS description information that correspond to the second core network element and parameter type information and a parameter requirement in the at least one piece of QoS description information that correspond to at least one of a third core network element, an access network element, and a terminal device.

11. The method according to claim 10, wherein the determining of the at least one piece of target QoS description information is further based on the feedback information of the parameter type information and the parameter requirement in the at least one piece of QoS description information that correspond to at least one of the first core network element, the third core network element, the access network element, the terminal device, or the other of the second core network element and the application function network element.

12. An apparatus, comprising:
  at least one processor; and
  a memory, configured to store an instruction, which when executed by the at least one processor, cause the apparatus to:
  receive, from a data analytics network element, at least one piece of QoS description information of a service, wherein each piece of the at least one piece of QoS description information comprises parameter type information and a parameter requirement;
  send, to a first core network element or an application function network element corresponding to the service, parameter type information and a parameter requirement in the at least one piece of QoS description information that correspond to the first core network element or the application function network element;
  receive, from the first core network element or the application function network element, feedback information of the parameter type information and the parameter requirement in the at least one piece of QoS description information that correspond to the first core network element or the application function network element; and
  determine at least one piece of target QoS description information in the at least one piece of QoS description information based on the feedback information.

13. The apparatus according to claim 12, wherein
  each piece of the at least one piece of QoS description information further comprises network element information, and
  the network element information indicates a network element corresponding to the parameter type information and the parameter requirement in the at least one piece of QoS description information.

14. The apparatus according to claim 12, wherein the apparatus is further caused to:
  determine information indicating whether the apparatus satisfies parameter type information and a parameter requirement in the at least one piece of QoS description information that correspond to the apparatus.

15. The apparatus according to claim 12, wherein the feedback information indicates whether the first core network element satisfies the parameter type information and the parameter requirement that are sent by the apparatus and that correspond to the first core network element.

16. The apparatus according to claim 12, wherein the feedback information received from the application function network element indicates whether the application function network element satisfies the parameter type information and the parameter requirement.

17. The apparatus according to claim 14, wherein the apparatus is further caused to:
  send, to the application function network element corresponding to the service, the parameter type information and the parameter requirement in the at least one piece of QoS description information that correspond to the application function network element and the information indicating whether the apparatus satisfies the parameter type information and the parameter requirement in the at least one piece of QoS description information that correspond to the apparatus.

18. The apparatus according to claim 12, wherein the apparatus is further caused to:
  send, to the first core network element corresponding to the service, the parameter type information and the parameter requirement in the at least one piece of QoS description information that correspond to the first core network element and parameter type information and a parameter requirement in the at least one piece of QoS description information that correspond to at least one of a second core network element, an access network element, and a terminal device.

19. The apparatus according to claim 18, wherein the determining of the at least one piece of target QoS description information is further based on the feedback information of the parameter type information and the parameter requirement in the at least one piece of QoS description information that correspond to at least one of the apparatus, the second core network element, the access network element, the terminal device, or the other of the first core network element and the application function network element.

20. A system, comprising:
  a first core network element;
  one or more of a second core network element or an application function network element; and
  a data analytics network element,
wherein
  the data analytics network element is configured to send at least one piece of QoS description information of a service to the first core network element, wherein each piece of the at least one piece of QoS description information comprises parameter type information and a parameter requirement, and
  the first core network element is configured to:
    send to the second core network element or the application function network element corresponding to the service, parameter type information and a parameter requirement in the at least one piece of QoS description information that correspond to the second core network element or the application function network element;
    receive, from the second core network element or the application function network element, feedback information of the parameter type information and the parameter requirement in the at least one piece of QoS description information that correspond to the second core network element or the application function network element; and
    determine at least one piece of target QoS description information in the at least one piece of QoS description information based on the feedback information.

* * * * *